(12) United States Patent
Wakitani et al.

(10) Patent No.: US 6,564,481 B2
(45) Date of Patent: May 20, 2003

(54) ELECTRIC VEHICLE AND TRANSIT CONTROL METHOD THEREOF

(75) Inventors: Tsutomu Wakitani, Wako (JP); Keiichiro Bungo, Wako (JP); Kenji Kuroiwa, Wako (JP); Tsutomu Inui, Wako (JP); Hiroo Kanke, Wako (JP); Jitsumi Hanafusa, Wako (JP); Takahiro Yamamoto, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 31 days.

(21) Appl. No.: 10/021,539

(22) Filed: Oct. 29, 2001

(65) Prior Publication Data

US 2002/0062583 A1 May 30, 2002

(30) Foreign Application Priority Data

Oct. 30, 2000 (JP) ........................................ 2000-331549
Oct. 30, 2000 (JP) ........................................ 2000-331551
Oct. 30, 2000 (JP) ........................................ 2000-331552
Oct. 30, 2000 (JP) ........................................ 2000-331562
May 1, 2001 (JP) ........................................ 2001-134689

(51) Int. Cl.[7] .............................. E01H 5/09; E01H 5/08; B62D 51/04
(52) U.S. Cl. ........................................ 37/348; 180/19.3
(58) Field of Search .............................. 701/50; 37/347, 37/348, 466, 219, 234, 260, 257, 261–265, 271; 180/19.2, 19.3, 68.5, 68.2; 74/523, 554

(56) References Cited

U.S. PATENT DOCUMENTS

| 4,572,311 | A | * | 2/1986 | Oswald et al. ............. 180/6.48 |
| 6,173,799 | B1 | * | 1/2001 | Miyazaki et al. .......... 180/19.3 |
| 6,267,190 | B1 | * | 7/2001 | Micheletti .................... 180/183 |
| 6,273,212 | B1 | * | 8/2001 | Husted et al. .............. 180/205 |
| 6,499,236 | B2 | * | 12/2002 | Yoshida et al. ................ 37/219 |

FOREIGN PATENT DOCUMENTS

| JP | 48004260 | 2/1973 |
| JP | 50107619 | 8/1975 |
| JP | 51137214 | 11/1976 |
| JP | 57043003 | 9/1982 |

* cited by examiner

*Primary Examiner*—Robert E. Pezzuto
(74) *Attorney, Agent, or Firm*—Adams & Wilks

(57) ABSTRACT

An electric vehicle has left and right speed control levers provided alongside left and right grips provided at the ends of left and right control handles. The electric vehicle also has left and right electric motors for driving left and right driven wheels and left and right brakes for braking the left and right driven wheels. The left brake and the speed of the left electric motor are controlled with the left speed control lever, the right brake and the speed of the right electric motor are controlled with the right speed control lever, and a driver can execute changes of direction and pivot turns and spot turns while holding the vehicle in a good attitude.

14 Claims, 31 Drawing Sheets

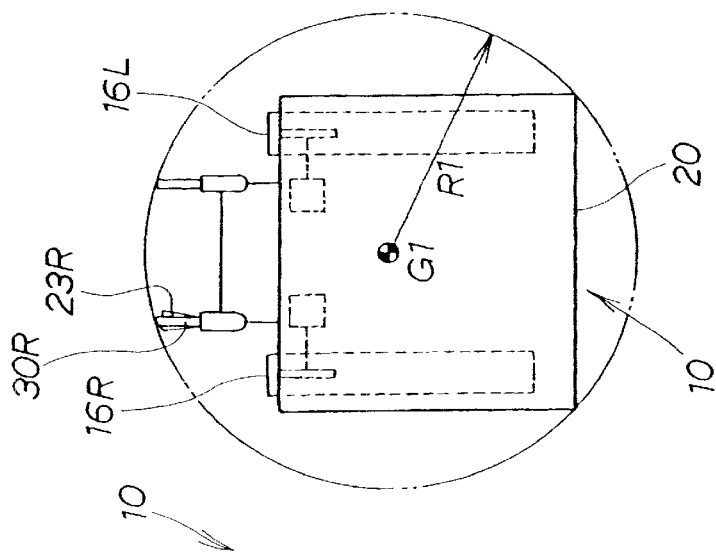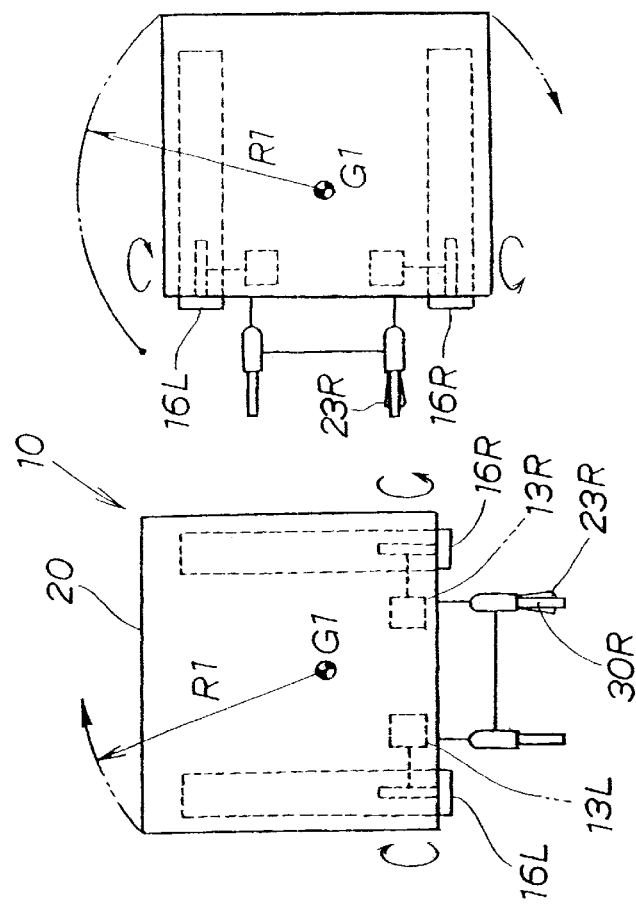

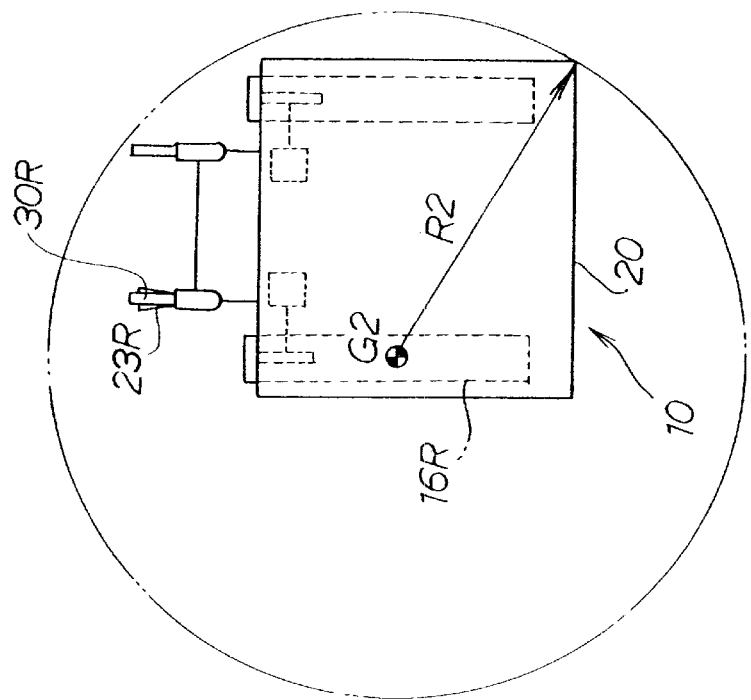
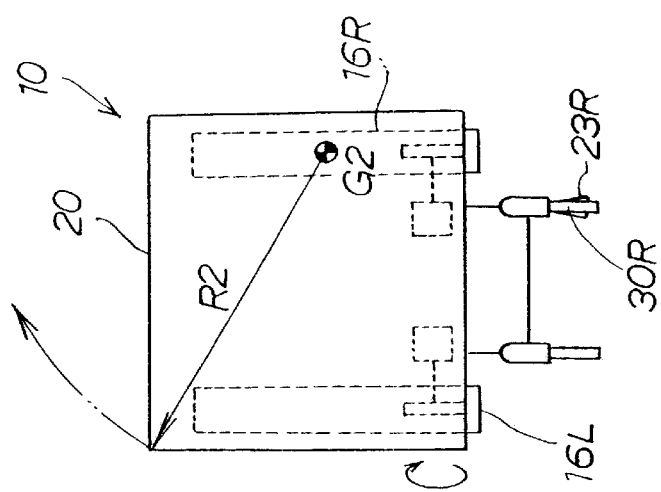

ELECTRIC VEHICLE AND TRANSIT CONTROL METHOD THEREOF

FILED OF THE INVENTION

This invention relates to an electric vehicle having left and right electric motors driving left and right driven wheels.

BACKGROUND OF THE INVENTION

"Utility machine" is a term which refers generally to dollies used for loading and unloading; cultivators and tractors used in farming; mowers for cutting grass; and snow-removers and soon. Among utility machines there are electric vehicles propelled by electric motors. An electric vehicle of this kind is referred to in Japanese Patent Laid-Open Publication No.SHO-50-107619, "Steering Control Apparatus of Electric Dolly". This electric dolly is shown in FIG. 27 hereof.

In FIG. 27, left and right electric motors (not shown) of an electric dolly 200 drive left and right driven wheels 201L, 201R to propel the electric dolly 200 along a path 202. When while the electric dolly 200 is traveling it deviates from the path 202 and a left side sensor 204L touches a left side slope 203L, the right side electric motor reverse-rotates to change the direction of the electric dolly 200 so that it returns to the path 202.

When the electric dolly 200 deviates from the path 202 and a right side sensor 204R touches a right side slope 203R, the left side electric motor reverse-rotates to change the direction of the electric dolly 200 so that it returns to the path 202.

However, because the electric dolly 200 starts to change direction only after one of the left and right sensors 204L, 204R has made contact with the respective slope 203L or 203R, it deviates relatively far from the path 202 before changing direction. Consequently, the electric dolly 200 snakes as it travels.

This snaking can be prevented by the driver changing the direction of the electric dolly 200 before either of the left and right sensors 204L, 204R touches the respective slope 203L or 203R. However, for the driver to change the direction of the electric dolly 200 without relying on the left and right sensors 204L and 204R, it is necessary for the driver to grip an operating handle 205 strongly and turn the electric dolly 200 with great force.

Changing the direction of the electric dolly 200 without relying on the left and right sensors 204L and 204R like this puts a large burden on the driver.

Also, when the driver changes the direction of the electric dolly 200 by force, the electric dolly 200 becomes unsteady and difficult to keep in a good traveling attitude.

To overcome this, electric vehicles having left and right electric motors driving left and right driven wheels and left and right brakes for adjusting the speeds of the left and right driven wheels have been proposed, as for example in Japanese Patent Publication No. SHO-48-4260, "Direction and Propulsion Control Apparatus of Electric Car". With this electric car, transit control is possible whereby when an operating lever is pushed forward the car accelerates; when the operating lever is pulled backward the car is braked or reverses; when the operating lever is pushed to the left the right rear wheel accelerates but the left rear wheel is braked or reverses; and when the operating lever is pushed to the right the left rear wheel accelerates but the right rear wheel is braked or reverses. This transit control is carried out by the operating lever being operated to directly alter the settings of multiple potentiometers and thereby control respective electric currents supplied to the left and right electric motors.

However, in this case, the supplies of power to the left and right electric motors are altered in correspondence with the angle of inclination of the operating lever, essentially irrespective of the speed of the vehicle. And consequently, for example with an electric dolly, although there is no problem when the speed of the dolly is low, if the operating lever is operated when the speed is high, the dolly is liable to turn excessively due to inertial force.

Another electric vehicle having left and right electric motors driving left and right driven wheels appears in for example Japanese Patent Publication No. SHO-57-43003, "Motor Control Apparatus of Electric Car". In an electric vehicle having a driving motor for each of a pair of wheels, this control apparatus inputs speed detection signals from speed detectors provided on each motor to a differential amplifier, and on the basis of this differential output controls the speed of one of the motors in correspondence with speed fluctuations of the other motor.

When the electric vehicle hits an irregularity in the road surface or a slope, the speed of one of the wheels may drop. When this happens without correction, the electric vehicle turns to the right or the left instead of moving straight forward, which is undesirable. To avoid this, with the control apparatus mentioned above, the speeds of the left and right wheels are matched, and consequently the electric vehicle does not turn on its own as a result of the state of the road surface.

In the above-mentioned Japanese Patent Publication No. SHO-57-43003, it is explained that when the operating shaft is tilted to the left or the right a speed difference between the left and right electric motors is generated and the electric vehicle turns to the left or the right. But in this case, it is difficult to distinguish whether the cause of a speed difference arising between the left and right wheels is an external one originating in the condition of the road surface or a human-initiated one (the operating shaft being operated). To make this distinction an electronic distinguishing circuit is needed, and electronic distinguishing circuits of this kind are complicated and costly, and even then the reliability of their distinguishing is not said to be high.

An invention relating to a rotary snow-clearing vehicle is disclosed in Japanese Patent Laid-Open Publication No. SHO-51-137214, "Control Method of Rotary Snow-Clearing Vehicle having Automatic Speed Control Apparatus". In this control method, which is suitable for a rotary snow-clearing vehicle which travels on rails, the load on an engine for clearing snow is detected with a sensor, and the transit speed of the rotary snow-clearing vehicle is controlled on the basis of this detection signal. In the case of a rotary snow-clearing vehicle which simply moves forward or backward along rails, there is no problem; but with a snow-clearing machine for clearing snow from an ordinary road, because the vehicle body rocks to the left and the right under the action of the road surface and snow, the driver must constantly control the vehicle to the forward direction. Consequently, with a snow-clearing machine for ordinary roads, the control method mentioned above cannot be employed.

SUMMARY OF THE INVENTION

It is therefore an object of the present invention to provide an electric vehicle with which it is possible to make direction adjustments and turns of the electric vehicle without putting a burden on the driver and it is possible to make direction adjustments and turns with the electric vehicle in a stable state.

To achieve this object and other objects, a first aspect of the invention provides an electric vehicle having: a vehicle body; a left electric motor, mounted on the vehicle body, for driving a left driven wheel; a left brake, mounted on the vehicle body, for braking the left driven wheel; a right electric motor, mounted on the vehicle body, for driving a right driven wheel; a right brake, mounted on the vehicle body, for braking the right driven wheel; left and right control handles extending rearward from the vehicle body; left and right grips provided at the ends of the control handles; a left speed control lever, provided alongside the left grip, for controlling the left electric motor and the left brake; and a right speed control lever, provided alongside the right grip, for controlling the right electric motor and the right brake.

Left and right speed control levers are provided alongside left and right grips, and a left brake and electric motor are controlled with the left speed control lever and a right brake and electric motor are controlled with the right speed control lever. Consequently, because a driver can operate the left and right speed control levers while holding the left and right grips, the driver can make direction adjustments and turns of the vehicle with the left and right speed control levers while keeping the vehicle in a good attitude with the left and right grips. Also, because the driver can operate the left and right speed control levers while holding the left and right grips, the driver can easily operate the left and right speed control levers just with the fingers, without moving either hand. Consequently, the driver can operate the left and right speed control levers with a natural operating feeling (with an easy action).

An electric vehicle according to this first aspect of the invention also has a control unit for controlling the left and right electric motors. This control unit reads in the positions of an accelerator lever and the left and right speed control levers as an accelerator angle and a left brake angle and a right brake angle and converts the accelerator angle, the left brake angle and the right brake angle into an accelerator percentage, a left brake percentage and a right brake percentage and obtains a corrected left brake percentage by adjusting the left brake percentage for the influence of the right brake percentage and by correcting the accelerator percentage with this corrected left brake percentage obtains a left motor control value and controls the left electric motor with this left motor control value and obtains a corrected right brake percentage by adjusting the right brake percentage for the influence of the left brake percentage and obtains a right motor control value by correcting the accelerator percentage with this corrected right brake percentage and controls the right electric motor with this right motor control value.

Normally, the electric motors are controlled directly on the basis of the accelerator angle. However, with this first aspect of the invention, control is implemented wherein for example in control of the left electric motor, when the left brake angle is large the left electric motor control value is lowered, and when the right brake angle is large this is also taken into account and the left motor control value is lowered further. And the same control is carried out for the right electric motor. As a result, the waste of rotating an electric motor at a high speed while applying a brake is avoided. Also, whereas ordinarily it sometimes happens that the vehicle shakes due to an unbalance between the left and right electric motors, according to this first aspect of the invention, because for example with respect to the left electric motor not only the left brake angle but also the right brake angle is taken into account, there is no risk of this happening, and irrespective of the state of the travel surface, speed adjustment is made easy and the vehicle can move smoothly.

This electric vehicle may be a snow-clearing machine having a utility tool with an auger for displacing snow and a blower for blowing out displaced snow. In a snow-clearing machine, the state of loads acting on the utility tool is complex. However, by controlling the orientation of the snow-clearing machine by controlling the left and right driving wheels in accordance with the invention, this problem can be overcome and the auger and blower protected and efficient snow-clearing carried out.

A second aspect of the invention provides a transit control method for an electric vehicle having left and right electric motors for driving left and right driven wheels and having left and right brakes for adjusting the speeds of the left and right driven wheels, the method including the steps of: substituting the positions of an accelerator lever and left and right speed control levers controlled by an operator as an accelerator angle, a left brake angle and a right brake angle; converting the accelerator angle, the left brake angle and the right brake angle into an accelerator percentage, a left brake percentage and a right brake percentage; obtaining a corrected left brake percentage by adjusting the left brake percentage for the influence of the right brake percentage, obtaining a left motor control value by correcting the accelerator percentage with the corrected left brake percentage, and controlling the left electric motor with the left motor control value; and obtaining a corrected right brake percentage by adjusting the right brake percentage for the influence of the left brake percentage, obtaining a right motor control value by correcting the accelerator percentage with the corrected right brake percentage, and controlling the right electric motor with the right motor control value.

This electric vehicle may further have a utility tool, an engine for driving the utility tool and a clutch provided in a power transmission path from the engine to the utility tool, and in this case, preferably, the left motor control value is obtained by multiplying a value reached by correcting the accelerator percentage with the corrected left brake percentage by a correction coefficient less than one set in correspondence with a reduction in the speed of the engine occurring when the clutch is ON, and the right motor control value is obtained by multiplying a value reached by correcting the accelerator percentage with the corrected right brake percentage by a correction coefficient less than one set in correspondence with a reduction in the speed of the engine occurring when the clutch is ON.

When a large load acts on the utility tool, the speed of the engine falls sharply. When this happens, the outputs of the left and right electric motors are lowered and the transit speed of the machine is reduced. That is, the speed of transit of the vehicle can be made to correspond to the load on the utility tool; stopping of transiting of the utility machine due to an excessive load can be prevented; and because the work being carried out by the utility tool is interrupted less often, an improvement in the efficiency of that work can be achieved. Also, because the load acting on the utility part can be reduced, damage to the utility part can be suppressed and an increase in the life of the utility part can be achieved.

In a control method according to this second aspect of the invention, preferably, when the left and right brake angles are essentially the same, the speeds of the left and right electric motors are read in and the speed of the whichever of the left and right electric motors is at the higher speed is controlled to the speed of the electric motor at the lower speed. That is, in straight-forward running, only when the left and right brake angles are essentially the same, control is carried out to match the speeds of the left and right electric motors. By this means it is possible to raise the straight-forward characteristic of the vehicle without being affected by the path condition. And because it is the higher speed that is adjusted to match the lower speed, when one of the driving wheels has mounted an irregularity in the path surface or a slope, the speed of the vehicle is lowered and stabilizing the vehicle body is made easier.

Also, in a control method according to this second aspect of the invention, preferably, when the accelerator percentage is written ACC %, the left brake percentage is written BKL %, the right brake percentage is written BKR %, a coefficient of influence on whichever of the left and right electric motors is being considered of the brake percentage pertaining to the other electric motor is written p (where p<1), and the maximum value of the control value of each electric motor is written Vmax, then the corrected left brake percentage is calculated as (BKL %+p×BKR %×ACC %), the left motor control value TG2L is calculated as Vmax×ACC %×{1−(BKL %+p×BKR %×ACC %)}, the corrected right brake percentage is calculated as (BKR %+p×BKL %×ACC %), and the right motor control value TG2R is calculated as Vmax×ACC %×{1−(BKR %+p×BKL %×ACC %)}. In this way, the accelerator percentage ACC % is taken into account in obtaining the corrected left brake percentage (BKL %+p× BKR %×ACC %). By weakening the influence of the right brake percentage BKR % on the left motor control value when the accelerator percentage ACC %, which is linked to the vehicle speed, is small, and strengthening it when the accelerator percentage ACC % is large, a left motor control value TG2L corresponding to the vehicle speed is set. And the same applies to the right motor control value TG2R.

Also, in a control method according to this second aspect of the invention, when the electric vehicle further has a utility tool and an engine for driving the utility tool and a clutch disposed in a power transmission path from the engine to the utility tool, the left and right electric motors are preferably controlled in accordance with a detected load on the engine. Specifically, for example, the left motor control value is obtained by multiplying a value reached by correcting the accelerator percentage with the corrected left brake percentage by a correction coefficient less than one set in correspondence with a reduction in the intake negative pressure of the engine occurring when the clutch is ON, and the right motor control value is obtained by multiplying a value reached by correcting the accelerator percentage with the corrected right brake percentage by a correction coefficient less than one set in correspondence with a reduction in the intake negative pressure of the engine occurring when the clutch is ON. That is, when the engine encounters a large load, the intake negative pressure of the engine rises. And at this time, control is executed to lower the outputs of the left and right electric motors and reduce the transit speed of the electric vehicle.

BRIEF DESCRIPTION OF THE DRAWINGS

Certain preferred embodiments of the present invention will be described in detail below, by way of example only, with reference to the accompanying drawings, in which:

FIGS. 7A through 7C are plan views illustrating the electric vehicle of the first preferred embodiment executing a "spot" turn;

FIGS. 8A and 8B are plan views illustrating the electric vehicle of the first preferred embodiment executing a "pivot" turn;

DETAILED DESCRIPTION OF THE PREFERRED EMBODIMENTS

Figure 1:
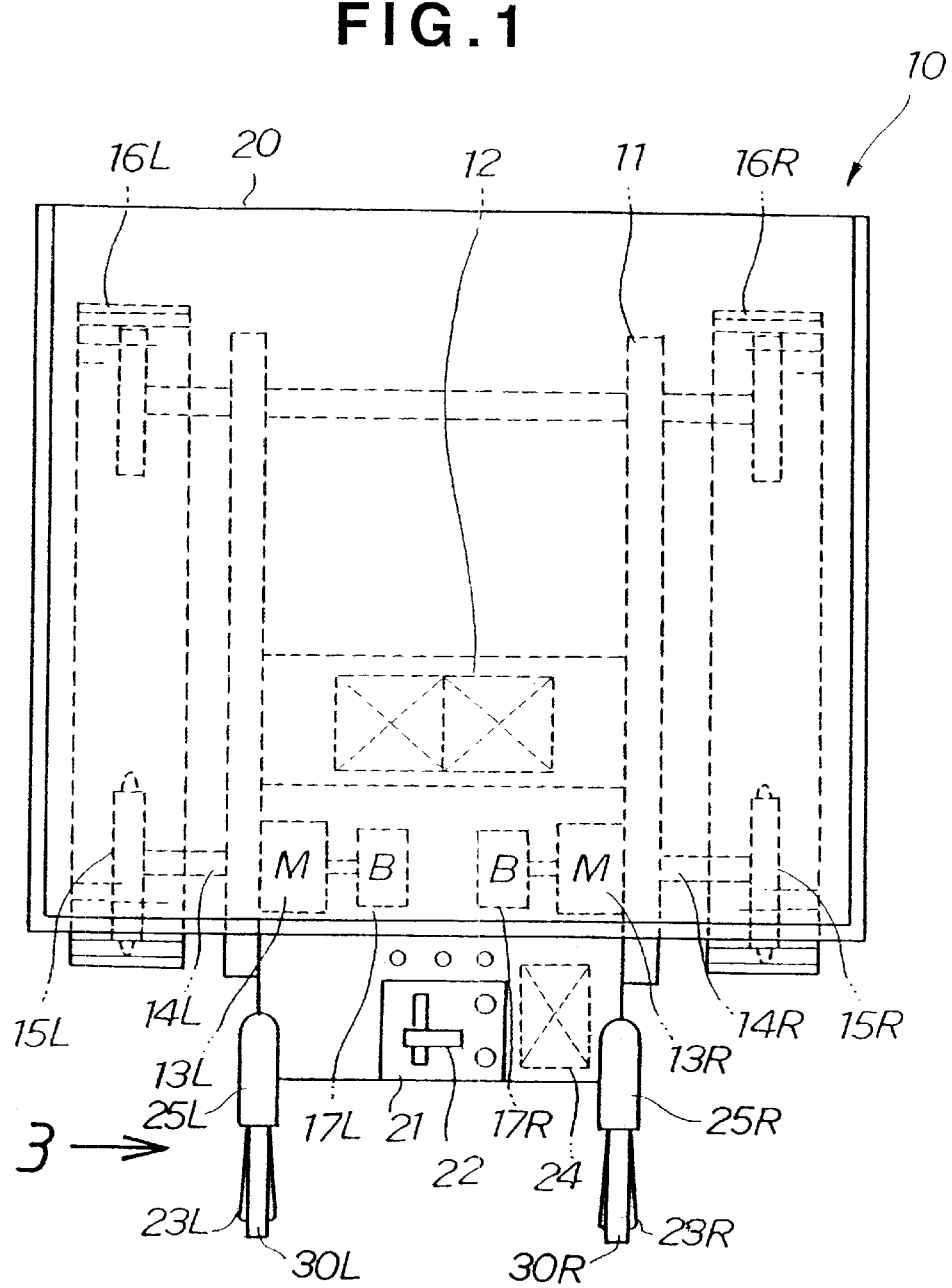
FIG. 1 is a plan view of an electric vehicle according to a first preferred embodiment of the present invention.

FIGS. 1 through 8 show an electric vehicle according to a first preferred embodiment of the invention. In FIG. 1, an electric dolly 10 constituting an electric vehicle has left and right electric motors 13L, 13R powered by a battery 12 housed in a vehicle frame (body) 11. The left and right electric motors 13L, 13R drive left and right drive shafts 14L, 14R. Driven wheels 15L, 15R mounted on the ends of the drive shafts 14L, 14R drive left and right crawlers 16L, 16R. The driven wheels 15L, 15R are braked by the operation of left and right brakes 17L, 17R. A load-carrying platform 20 is mounted on the vehicle frame 11. A control panel 21 is mounted at the rear of the load-carrying platform 20. This control panel 21 has a single accelerator lever 22. Left and right control handles 25L, 25R extend rearward from the control panel 21 (or the vehicle frame 11 or the load-carrying platform 20).

Left and right grips 30L, 30R are provided at the ends of the left and right control handles 25L, 25R. A left speed control lever 23L for controlling the left brake 17L and the left electric motor 13L is provided extending alongside the left grip 30L. A right speed control lever 23R for controlling the right brake 17R and the right electric motor 13R is provided extending alongside the right grip 30R.

A driver does not ride the dolly but walks behind the dolly and advances, reverses, turns and stops the dolly by operating the levers on the control panel 21 (including the accelerator lever 22 and the left and right speed control levers 23L, 23R).

The reference number 24 denotes a control unit, and this control unit 24 controls en bloc the electric motors 13L, 13R and the brakes 17L, 17R on the basis of the positions of the accelerator lever 22 and the left and right speed control levers 23L, 23R.

The brakes 17L, 17R may be electromagnetic brakes which apply a braking force through an electromagnetic action; hydraulic brakes which grip a disc with a hydraulic pressure; mechanical brakes which clamp a drum with a band; regenerative brakes; or equivalent brakes of some other form or type.

Figure 2A:
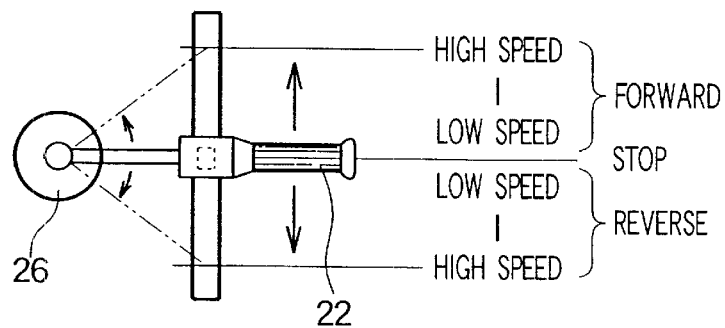
FIG. 2A is a view illustrating the operation of an accelerator lever and an accelerator potentiometer shown in FIG. 1, and FIGS. 2B and 2C are graphs showing the relationship between the position of the accelerator lever and the output voltage of the accelerator potentiometer.
Figure 2B:
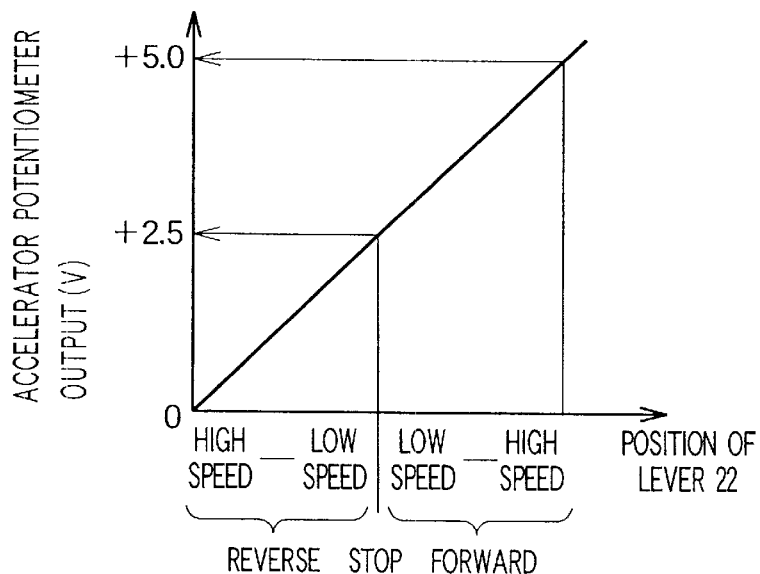
Figure 2C:
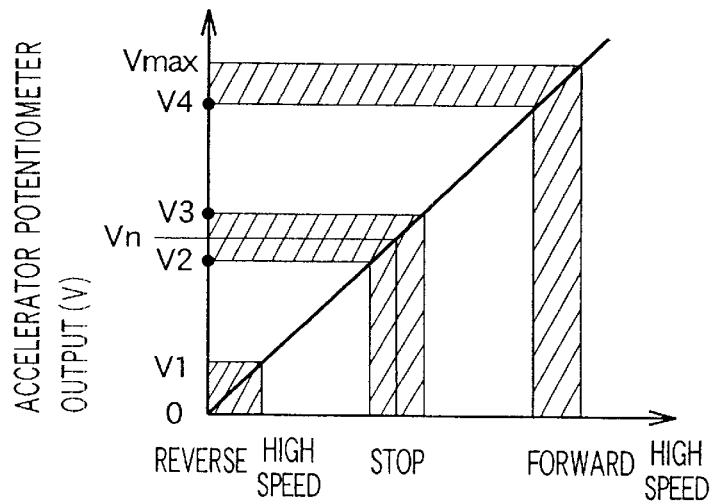

FIGS. 2A through 2C illustrate the action of the accelerator lever 22 employed in this first preferred embodiment of the invention.

Referring to FIG. 2A, the accelerator lever 22 is a control lever which provides forward, reverse and stop control with a single lever and with which it is also possible to switch continuously from a low speed to a high speed in either forward or reverse. The position of this accelerator lever 22 is monitored by an accelerator potentiometer 26.

FIG. 2B is a graph showing the relationship between the position of the accelerator lever 22 and the output of the accelerator potentiometer 26, and shows that with the voltage output range of the accelerator potentiometer 26 made 0 to +5 V, 0 V has been allocated to reverse full speed; +2.5 V to neutral (stop); and +5 V to forward full speed.

FIG. 2C is a graph obtained by generalizing FIG. 2B and processing it for the purposes of the control of this preferred embodiment. As in FIG. 2B, 0 V is allocated to reverse full speed (horizontal axis); Vn (vertical axis), which is the neutral voltage, is allocated to stop (horizontal axis); and Vmax (vertical axis), which is the maximum voltage, is allocated to forward full speed (horizontal axis).

When the driver sets the accelerator lever 22 shown in FIG. 2A to the vicinity of forward full speed, because it is the intention of the driver to invoke forward full speed, the control correction to be carried out in this preferred embodiment will not be applied. In FIG. 2C, the region between V4 and Vmax (shown with hatching in the figure) on the vertical axis is made a non-control region.

And when the driver sets the accelerator lever 22 shown in FIG. 2A to the vicinity of reverse full speed, because it is the intention of the driver to invoke reverse full speed, the control correction to be carried out in this preferred embodiment will not be applied. In FIG. 2C, the region between 0 and V1 (hatched) on the vertical axis is made a non-control region.

And when the driver sets the accelerator lever 22 shown in FIG. 2A to stop or very slow, again the control correction to be carried out in this preferred embodiment will not be applied. In FIG. 2C, the region between V2 and V3 (hatched) on the vertical axis is made a non-control region.

That is, the control of this preferred embodiment is carried out in the regions between V1 and V2 and between V3 and V4 on the vertical axis in FIG. 2C.

Figure 3:
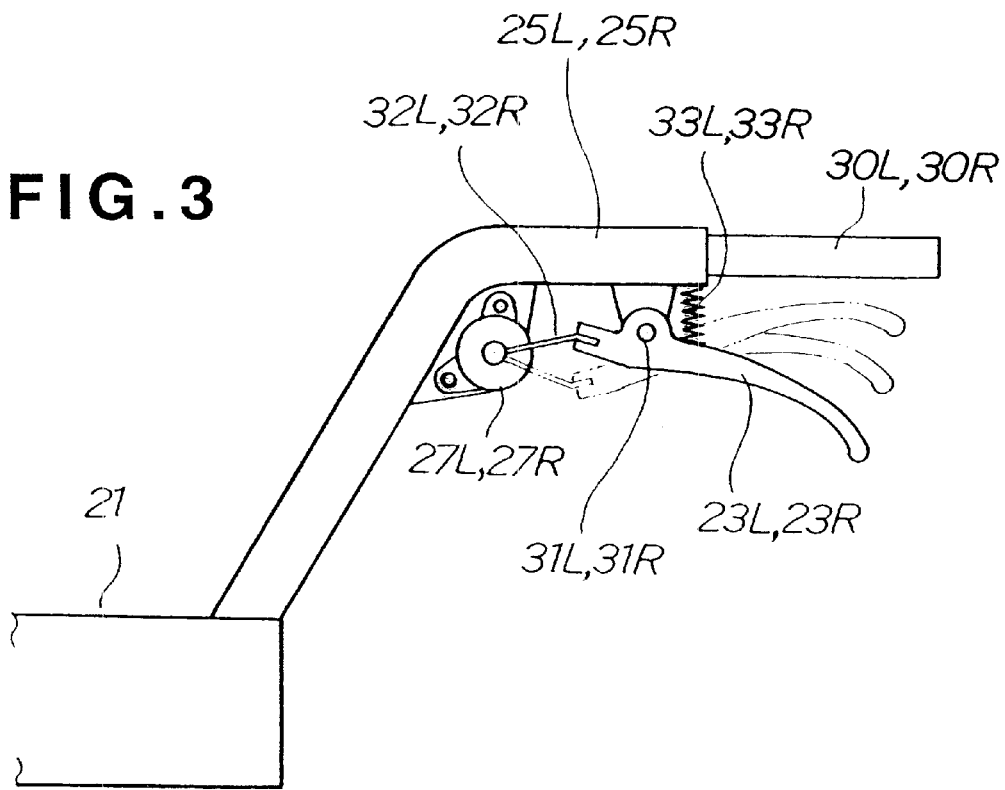
FIG. 3 is a side view of a speed control lever and a brake potentiometer as seen in the direction of the arrow 3 in FIG. 1.

FIG. 3 is an enlarged view in the direction of the arrow 3 in FIG. 1, showing the left and right speed control levers 23L, 23R. The left and right control handles 25L, 25R have at their ends the respective left and right grips 30L, 30R. The left and right speed control levers 23L, 23R are provided alongside and below the respective grips 30L, 30R and are so mounted on the control handles 25L, 25R by way of left and right hinge pins 31L, 31R that they can swing up and down. Arms 32L, 32R of brake potentiometers 27L, 27R are swung by the left and right speed control levers 23L, 23R. The left and right speed control levers 23L, 23R are urged to the position shown with a solid line by compression springs 33L, 33R. They move to a position shown with a broken line when gripped by the driver.

Figure 4A:
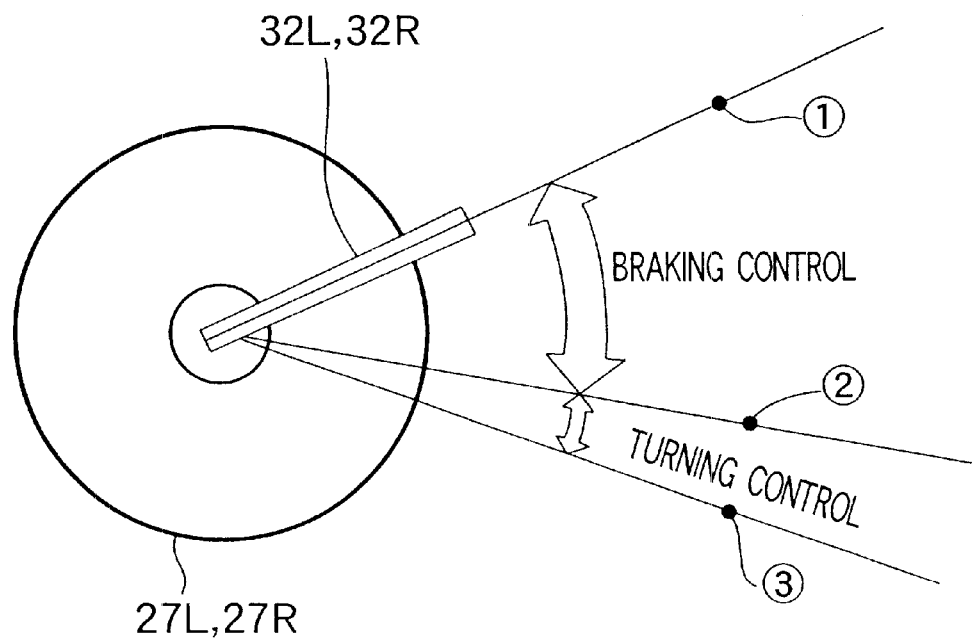
FIG. 4A is a view showing a braking control range and a turning control range of a speed control lever.
Figure 4B:
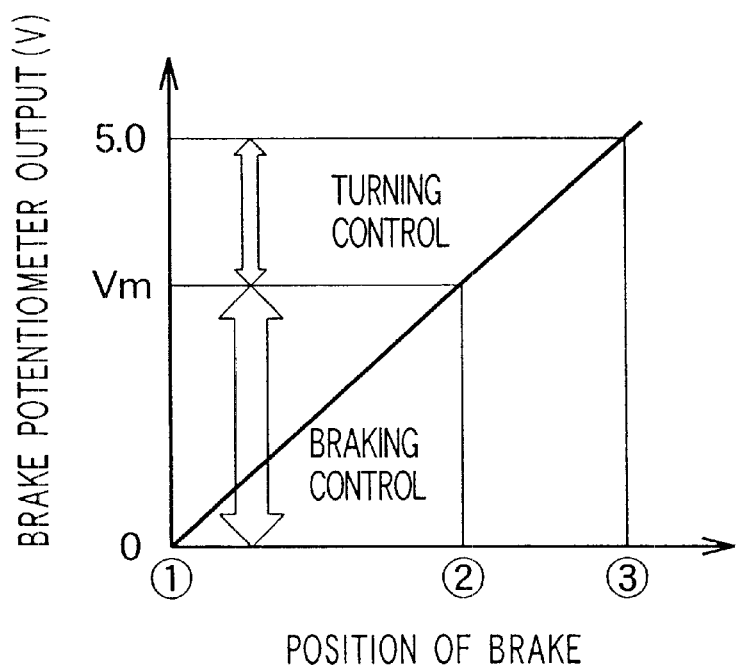
FIG. 4B is a graph showing the relationship between the position of the speed control lever and the output voltage of a brake potentiometer.

FIGS. 4A and 4B illustrate the action of the brake potentiometers 27L, 27R of this first preferred embodiment.

FIG. 4A is an enlarged view of one of the brake potentiometers 27L, 27R. The arms 32L, 32R of the brake potentiometers 27L, 27R move over a range of from a position [1] through a position [2] to a position [3]. Here, the position [1] will be called the 'no braking point' at the beginning of the movement range; the position [2] will be called the 'full braking point', part-way through the movement range; and the position [3] will be called the 'movement range end point'.

In the graph of FIG. 4B, the horizontal axis shows the pivot angle of the arm 32L or 32R of the brake potentiometer, i.e. the distance moved by the respective speed control lever, and the vertical axis shows the brake potentiometer output. In this example, 0 volts on the vertical axis is assigned to the no braking point [1] on the horizontal axis; Vm volts on the vertical axis is assigned to the full braking point [2] on the horizontal axis; and for example 5.0 volts is assigned to the movement range end point [3] on the horizontal axis. Vm is a voltage satisfying 0<Vm<5.0, and is set to for example 1.5 volts, 2.0 volts or 2.5 volts.

As a result, the range 0 to Vm volts on the vertical axis is a braking control range, and the range Vm to 5.0 volts on the vertical axis is a turning control range. And in FIG. 4A also, from position [1] (the start point of the movement range of the lever) to position [2] (part-way through the movement range of the lever) corresponds to braking control and from position [2] (part-way through the movement range of the lever) to position [3] (the end point of the movement range of the lever) corresponds to turning control.

Figure 5:
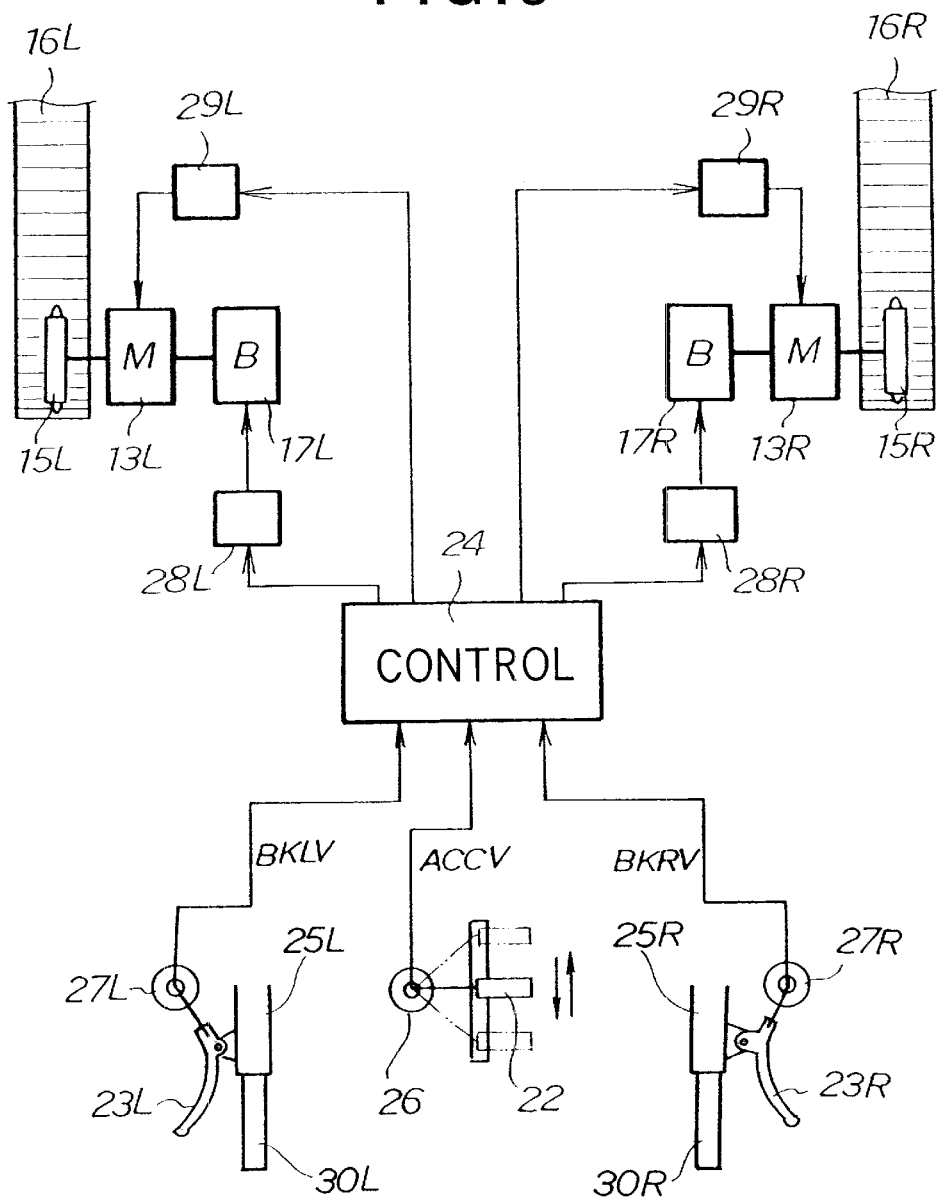
FIG. 5 is a control system diagram of the electric vehicle of the first preferred embodiment shown in FIG. 1.

FIG. 5 is a control system view of an electric vehicle (first preferred embodiment) according to the invention. When the left speed control lever 23L is operated, on the basis of the output voltage BKLV of the left brake potentiometer 27L connected to this, a left brake driver 28L brake-controls the left brake 17L. That is, as will be further discussed later, between [1] and [2] on the horizontal axis in FIG. 4B, a level of braking is changed proportionally in correspondence with the position of the left speed control lever 23L, or specifically the degree of gripping of the left speed control lever 23L.

Similarly, when the right speed control lever 23R is operated, on the basis of the output voltage BKRV of the right brake potentiometer 27R connected to this, a right brake driver 28R brake-controls the right brake 17R. That is, as will be further discussed later, between [1] and [2] on the horizontal axis in FIG. 4B, a level of braking is changed proportionally in correspondence with the position of the right speed control lever 23R, or specifically the degree of gripping of the right speed control lever 23R.

The control unit 24 takes in the output voltage ACCV of the accelerator potentiometer 26 and the output voltages BKLV, BKRV of the left and right brake potentiometers 27L and 27R, generates a left motor control value TG2L and a right motor control value TG2R in accordance with a control flow which will be further discussed later with reference to FIG. 14 and FIG. 15, and controls the left and right electric motors 13L, 13R by way of left and right motor drivers 29L, 29R.

Also, by gripping the left and right speed control levers 23L, 23R deeply, it is possible to effect turning which differs from braking. That is, between [2] and [3] on the horizontal axis in FIG. 4B, turning control is implemented without braking. The details of this will be discussed below.

Figure 6:
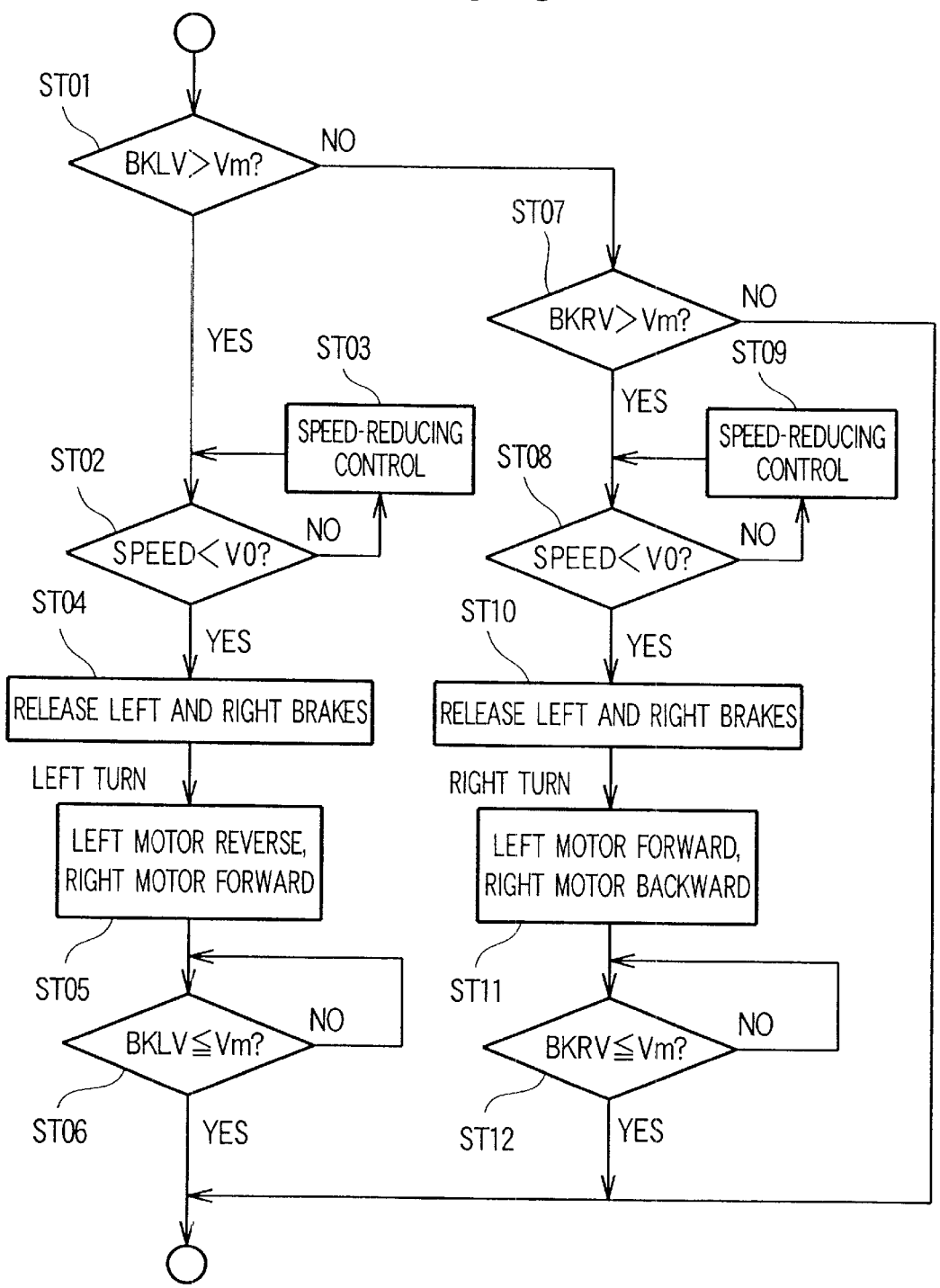
FIG. 6 a flow chart showing control executed by a control unit shown in FIG. 5 when turning of the electric vehicle is carried out with a speed control lever.

FIG. 6 is an operation flow chart for the left and right speed control levers of an electric vehicle (first preferred embodiment) according to the invention.

Step (hereinafter, ST) 01:

First, it is determined whether or not the output BKLV of the left brake potentiometer 27L is greater than Vm. As shown in FIG. 4B, a BKLV greater than Vm is in the turning control region. If the determination is YES then processing proceeds to ST02 and if it is NO then processing proceeds to ST07.

ST02:

If the determination of ST01 is YES, it is checked that the vehicle speed is zero or very low. V0 means a very low speed such that even a sharp turn is possible. If the vehicle speed is above V0, processing proceeds to ST03.

ST03:

The control unit performs speed-reducing control and lowers the vehicle speed. This speed-reducing control continues until ST02 is cleared.

ST04:

Because a brake operation may have been carried out as part of the speed-reducing control in ST03, here the left and right brakes are released.

ST05:

When the two conditions of BKLV being greater than Vm (ST01) and the vehicle speed being less than V0 (ST02) are satisfied, the control unit drives the left electric motor backward and the right electric motor forward. Consequently the electric vehicle starts to turn sharply to the left.

ST06:

When BKLV falls to Vm or below (to within the braking control region on the vertical axis in FIG. 4B), turning control is interrupted and a normal running state is resumed.

ST07:

If the determination in ST01 is NO, it is checked whether or not the right brake potentiometer output BKRV is greater than Vm. If YES then processing proceeds to ST08, and if NO then this control is discontinued. That is, because neither of the left and right brake potentiometer outputs BKLV and BKRV is in the turning control region, turning control is not executed.

ST08:

When the determination of ST07 is YES, it is checked that the vehicle speed is zero or very low. If the vehicle speed is equal to or greater than the very low speed V0, processing proceeds to ST09.

ST09:

The control unit carries out speed-reducing control to lower the vehicle speed. This speed-reducing control continues until ST08 is cleared.

ST10:

Because a brake operation may have been carried out as part of the speed-reducing control in ST09, here the left and right brakes are released.

ST11:

When the two conditions of BKRV being greater than Vm (ST07) and the vehicle speed being less than V0 (ST08) are satisfied, the control unit drives the left electric motor forward and the right electric motor backward. Consequently the electric vehicle starts to turn sharply to the right.

ST12:

When BKRV falls to Vm or below, turning control is interrupted and a normal running state is resumed.

As the speed of the electric motors for the turn carried out in ST05 or ST11, either a constant value (fixed value) can be employed or a variable value can be employed. A variable value may for example be made a speed proportional to the position of the accelerator lever 22 shown in FIG. 2A, that is, to the accelerator potentiometer output. If this is done, during work being carried out at a high speed sharp turning is effected at a high speed and during work being carried out at a low speed sharp turning is effected at a low speed, so that turning is effected which corresponds to the work mode.

FIGS. 7A through 7C are views illustrating spot turning (turning in counter-rotation mode) in the present invention (first preferred embodiment), and show the example of a right spot turn.

Referring to FIG. 7A, when the right speed control lever 23R is gripped strongly, the left electric motor 13L forward-rotates and the left crawler 16L advances, and simultaneously the right electric motor 13R reverse-rotates and the right crawler 16R reverses. If the front-rear/left-right center of the left and right crawlers 16L, 16R is written as the turning center G1 and the distance to the left corner of the load-carrying platform 20 is written R1, then the electric dolly 10 starts to turn to the right about the turning center G1 within a turning radius of R1.

FIG. 7B shows the electric dolly 10 having turned to the right through 90°. The electric dolly 10 continues to turn to the right.

FIG. 7C shows the electric dolly 10 having turned through 180° to the right from the state shown in FIG. 7A. It can be seen that the turning area is contained within a circle of radius R1. Minimizing the turning area like this is the object of a spot turn. By operating the right speed control lever 23R at any time, the driver can execute a right spot turn. The case of making a left spot turn is the same.

The foregoing is a description of a "spot" turn, but because an electric dolly 10 according to the invention can also of course execute a "pivot" turn, for comparison with the spot turn described above a pivot turn will now be described on the basis of FIGS. 8A and 8B.

Referring to FIG. 8A, the right speed control lever 23R is gripped to the full braking point ([2] in FIG. 4A) or to immediately before the full braking point. This stops the right crawler 16R. However, because the left crawler 16L continues to crawl (in this example, forward), the electric dolly 10 starts to turn to the right. The turning center G2 at this time is the center of the right crawler 16R, and the turning radius R2 is the distance from the turning center G2 to the left corner of the load-carrying platform 20.

FIG. 8B shows the electric dolly 10 having turned through 180°. A circle of radius R2 with the turning center G2 as its center defines the turning area. This circle is larger than the circle of radius R1 shown in FIG. 7C. Accordingly, it will be understood that to minimize the turning area the spot turn illustrated in FIGS. 7A through 7C is best.

Considering here the sequence of operations carried out by the driver, if during travel it is necessary to adjust the direction of the electric dolly 10, by lightly gripping the left or right speed control lever the driver can create a speed differential between the left and right driven wheels and correct to the left or to the right the heading of the electric dolly 10.

To make a sudden correction of direction, the driver grips the left or right speed control lever more strongly. At this time, if the position of the speed control lever is the position [2] in FIG. 4A, a turn of the kind shown in FIGS. 8A and 8B can be executed, and if the speed control lever is between the positions [2] and [3] in FIG. 4A a turn of the kind shown in FIGS. 7A through 7C can be executed. That is, with this invention, a driver can freely make any turn from a gentle turn through a sharp turn to a spot turn (very sharp turn) just by operating the left or right speed control lever.

As has been described above, with the electric dolly 10 of this first preferred embodiment, left and right speed control levers 23L, 23R are provided alongside left and right grips 30L, 30R as shown in FIG. 1 and FIG. 3, and a left brake 17L and a left electric motor 13L are controlled with the left speed control lever 23L and a right brake 17R and a right electric motor 13R are controlled with a right speed control lever 23R.

Consequently, a driver can operate the speed control levers 23L, 23R while gripping the left and right grips 30L, 30R. As a result, while keeping the electric dolly 10 in a good attitude by gripping the grips 30L, 30R it is possible to execute a direction change or turn of the electric dolly 10 with the left and right speed control levers 23L and 23R, and consequently the electric dolly 10 can be driven in a weaving line in a stable state.

Also, because the driver can operate the left and right speed control levers 23L, 23R while still gripping the grips 30L and 30R, the driver can operate the left and right speed control levers 23L, 23R easily just with the fingers, without moving either hand. As a result of this, because the driver can operate the left and right speed control levers 23L, 23R with a natural operating feeling (without great effort), driver fatigue is lessened.

Next, an electric vehicle according to a second preferred embodiment of the invention will be described, on the basis of FIG. 9 through FIG. 12. In this second preferred embodiment, parts the same as in the first preferred embodiment have been given the same reference numerals and will not be described again. The following description takes as the electric vehicle the example of a snow remover.

Figure 9:
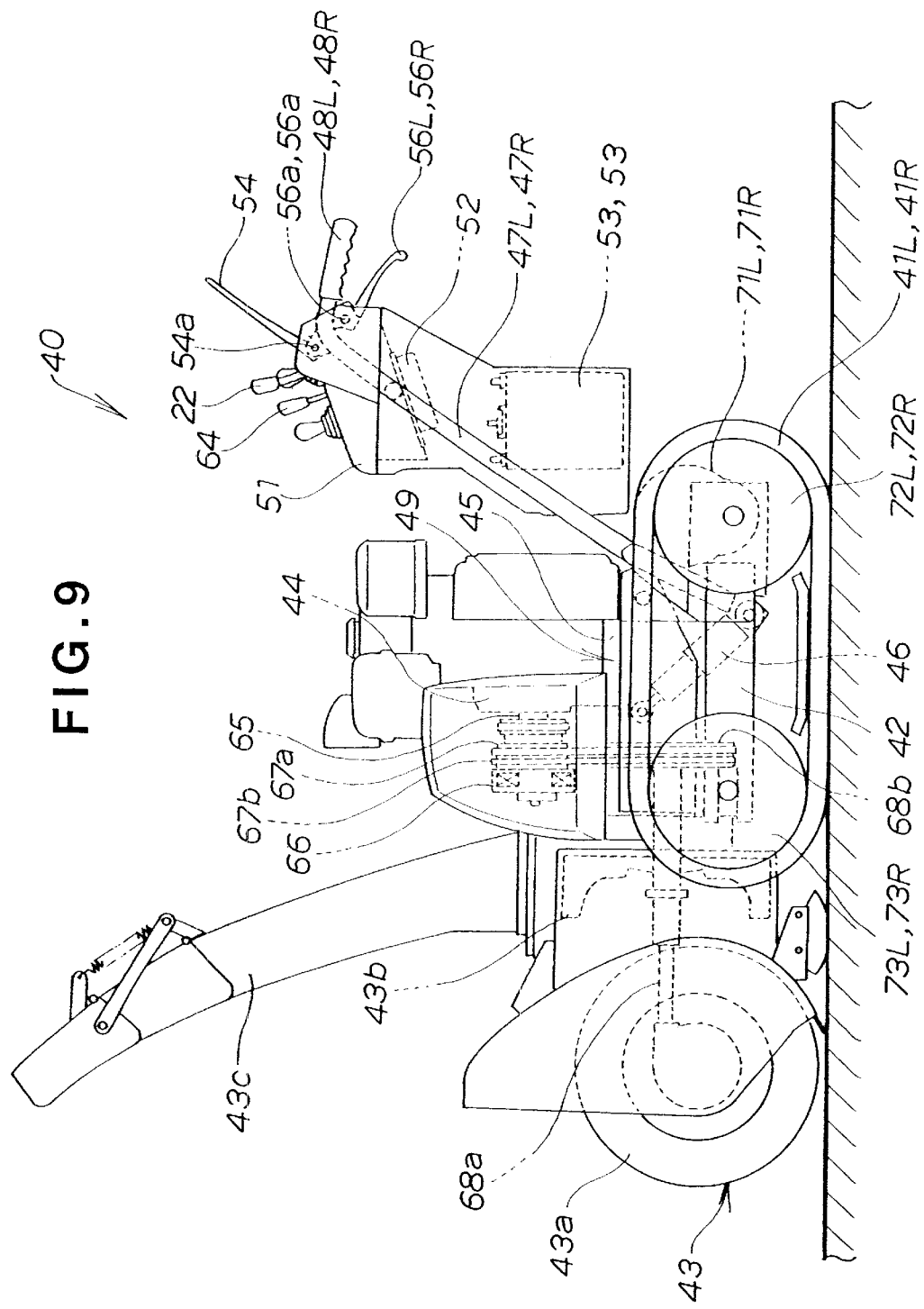
FIG. 9 is a side view of an electrically-propelled snow-clearing machine according to a second preferred embodiment of the invention, consisting of an electric vehicle according to the first preferred embodiment having an engine and a utility tool driven by the engine.
Figure 10:
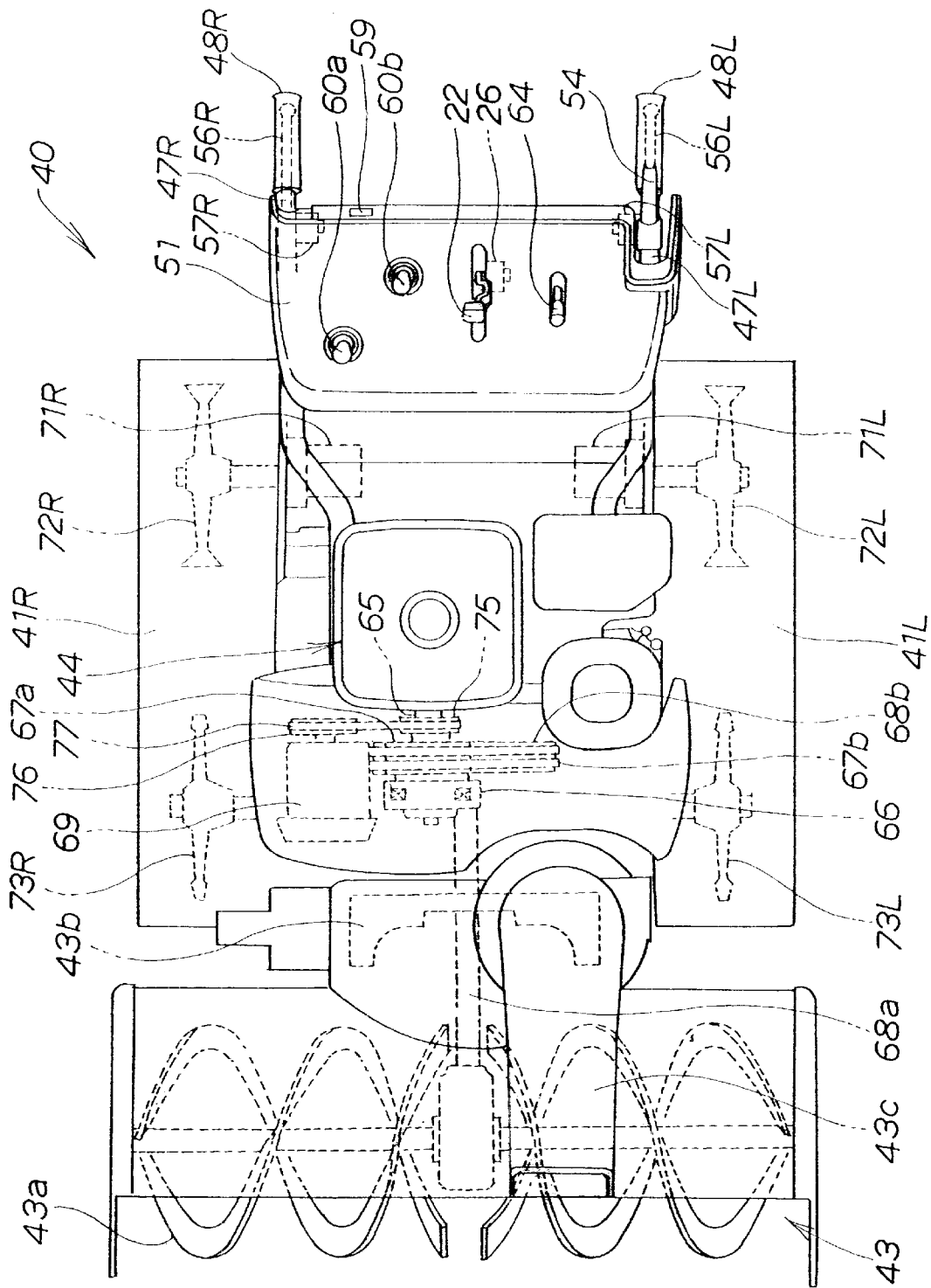
FIG. 10 is a plan view of the snow-clearing machine shown in FIG. 9.

Referring to FIG. 9 and FIG. 10, this snow remover 40 has a transport frame 42 having left and right crawler belts 41L, 41R and mounted on this transport frame 42 so that it can swing up and down a vehicle frame 45 having a snow-clearing utility part 43 and an engine 44 for driving this snow-clearing utility part 43, the front end of the vehicle frame 45 being made to swing up and down by a frame raising/lowering mechanism 46. Also, left and right control handles 47L, 47R extend rearward (specifically, upward and rearward) from the rear part of the transport frame 42. The transport frame 42 and the vehicle frame 45 constitute a machine body (vehicle body) 49.

The control handles 47L, 47R are gripped to operate the snow remover 40 by an operator (not shown) walking behind the snow remover 40. A control panel 51, a control unit 52 and batteries 53, 53 are mounted in this order from the top between the left and right control handles 47L, 47R.

Left and right grips 48L, 48R are attached to the ends of the left and right control handles 47L, 47R; a brake operating lever 54 is provided in the vicinity of the left grip 48L; and left and right speed control levers 56L, 56R are mounted near the left and right grips 48L, 48R.

The snow-clearing utility part 43 is made up of an auger 43a, a blower 43b and a shooter 43c mounted on the front end of the vehicle frame 45. Power from the output shaft 65 of the engine 44 is transmitted through an electromagnetic clutch 66 to a driving pulley 67a; rotation of the driving pulley 67a is transmitted by a transmission belt 67b to a driven pulley 68b; rotation of the driven pulley 68b is transmitted by a rotating shaft 68a to the auger 43a and the blower 43b; and snow scooped up by the auger 43a is shot to far away through the shooter 43c by the blower 43b.

As shown in FIG. 10, the crawler belts 41L, 41R are driven by left and right electric motors 71L, 71R via left and right driving wheels 72L, 72R disposed at the rear ends of the crawler belts 41L and 41R, and left and right rolling wheels 73L, 73R are disposed at the front ends of the crawler belts 41L, 41R.

The snow remover 40 moves under its own power by rotation of the electric motors 71L, 71R being transmitted to the left and right driving wheels 72L, 72R and driving the left and right crawler belts 41L, 41R.

A generator pulley 75 is mounted on the output shaft 65 projecting from the engine 44, and a drive belt 77 passes around this generator pulley 75 and a pulley 76 of a charging generator 69 so that rotation of the output shaft 65 is transmitted by the drive belt 77 to the charging generator 69.

Provided on the control panel 51 are a raising/lowering control lever 60a for operating the frame raising/lowering mechanism 46 (shown in FIG. 9); a shooter control lever 60b for changing the direction of the shooter 43c; an accelerator lever 22 (the same as in the first preferred embodiment); and a throttle lever 64 for the snow-clearing utility part 43, which controls the speed of the engine 44. The control panel 51 also has in the vicinity of the right side control handle 47R a clutch operating button 59. The clutch operating button 59 operates a switch which on/off-controls the electromagnetic clutch 66.

When snow-clearing is carried out with this snow remover 40, the operator does not ride the snow remover 40 but walks behind it and advances, reverses, turns and stops it by operating the accelerator lever 22 and the left and right speed control levers 56L, 56R.

The accelerator lever 22 and the left and right speed control levers 56L, 56R will now be discussed further on the basis of FIG. 11.

Figure 11:
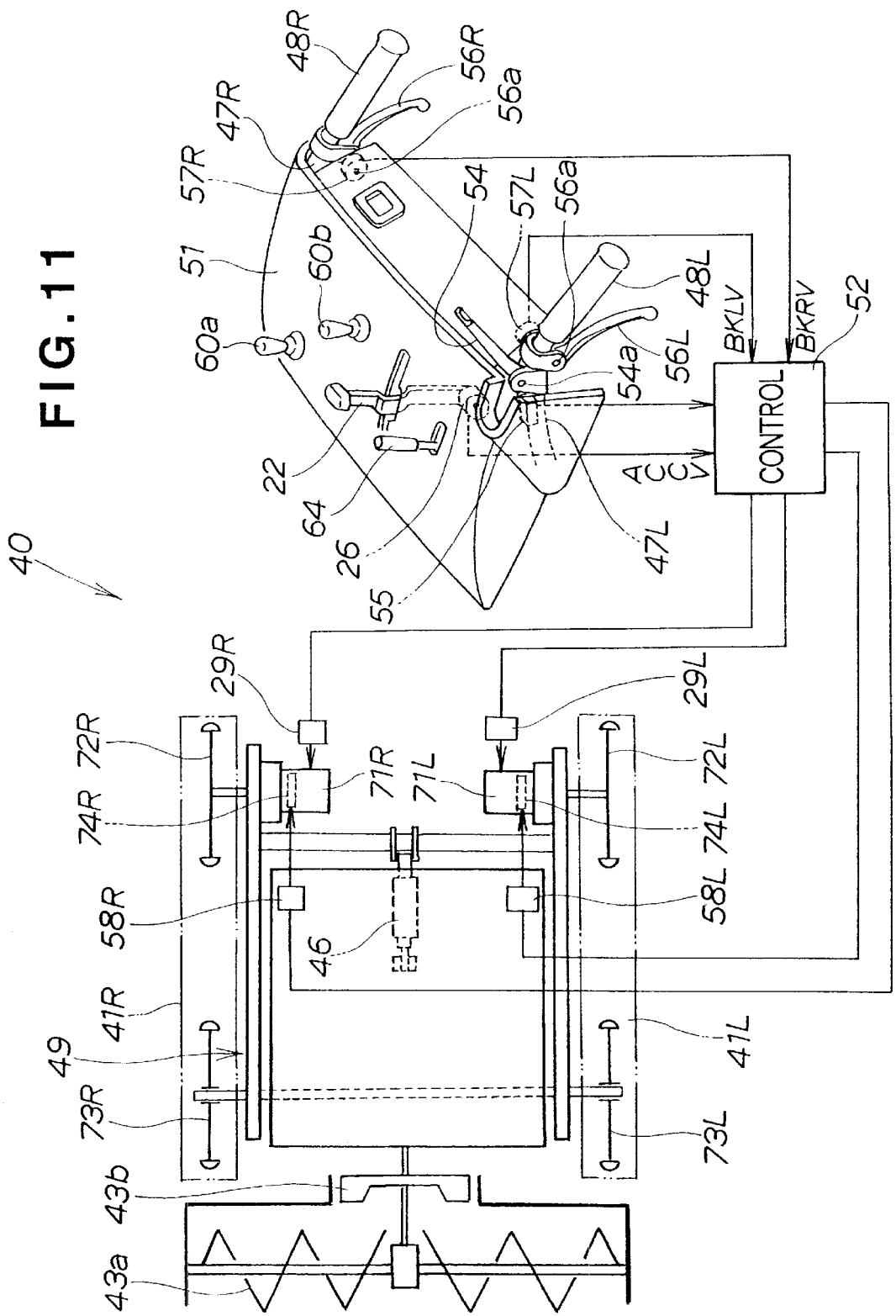
FIG. 11 is a control system diagram of an electrically-propelled snow-clearer according to the second preferred embodiment.

FIG. 11 is a control system view of an electric vehicle of this invention (second preferred embodiment). Mounted on the machine body 49 are the left electric motor 71L for driving the left driven wheel 72L, a left brake 74L for braking the left driven wheel 72L, the right electric motor 71R for driving the right driven wheel 72R, and a right brake 74R for braking the right driven wheel 72R. The left and right control handles 47L, 47R extend rearward from the machine body 49, and the left and right grips 48L, 48R are provided at the rear ends of these control handles 47L, 47R. The left speed control lever 56L for controlling the left brake 74L and the left electric motor 71L is mounted alongside the left grip 48L, and the right speed control lever 56R for controlling the right brake 74R and the right electric motor 71R is mounted alongside the right grip 48R.

The left and right brakes 74L, 74R, like the brakes 17L, 17R of the first preferred embodiment shown in FIG. 1, may be electromagnetic brakes which apply a braking force through an electromagnetic action; hydraulic brakes which grip a disc with a hydraulic pressure; mechanical brakes which clamp a drum with a band; regenerative brakes; or equivalent brakes of some other form or type.

Also, this snow remover 40 has on swing shafts 56a, 56a of the speed control levers 56L, 56R left and right brake position potentiometers 57L and 57R, and has on a swing shaft of the accelerator lever 22 an accelerator potentiometer 26 (the same as in the first preferred embodiment), and has on the left control handle 47L a brake switch 55.

The accelerator lever 22, as in the first preferred embodiment, is a control lever which provides forward, reverse and stop control with a single lever and with which it is also possible to switch continuously from a low speed to a high speed in either forward or reverse.

By an accelerator potentiometer 26 being actuated in correspondence with the position of this accelerator lever 22, the speeds of the electric motors 71L, 71R are controlled and the electric motors 71L, 71R are made to forward/reverse-rotate.

The brake switch 55 is a switch operated by the brake operating lever 54. Specifically, when the left grip 48L is gripped with the operator's left hand, the brake operating lever 54 is gripped as well and swings about a pin 54a toward the left grip 48L, whereupon the brake switch 55 assumes a break-releasing state. This brake operating lever 54 is a dead-man lever type parking lever.

The left and right brake position potentiometers 57L, 57R differ from the brake potentiometers 27L, 27R of the first preferred embodiment shown in FIG. 3 only in that they have the swing shafts 56a, 56a, and otherwise are of the same construction as in the first preferred embodiment.

Next, the operation of the left and right brake position potentiometers 57L, 57R of this second preferred embodiment will be explained, on the basis of FIGS. 12A and 12B.

Figure 12A:
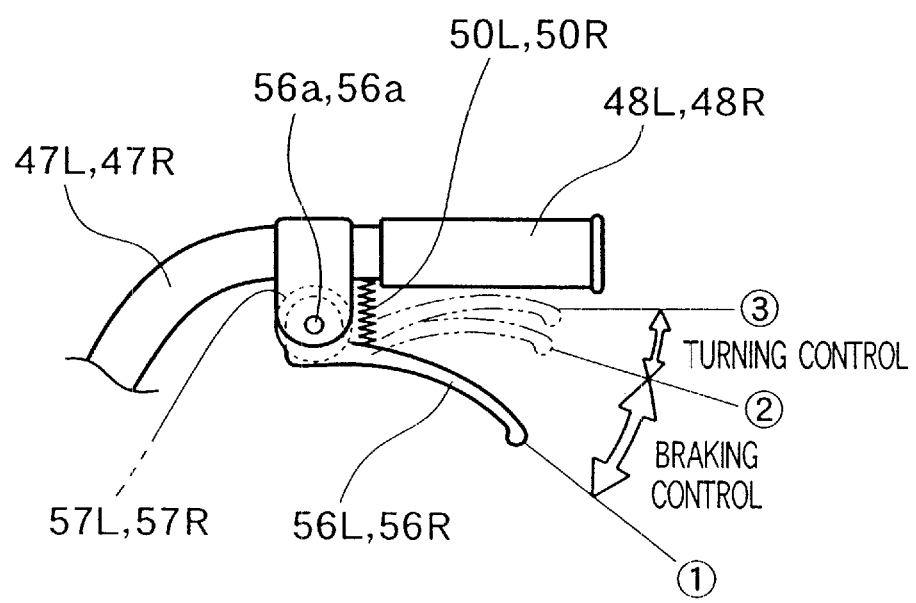
FIG. 12A is a view corresponding to FIG. 3 showing a braking range and a turning range of a speed control lever shown in FIG. 9.

FIG. 12A is an enlarged view of the speed control levers 56L, 56R and the respective brake potentiometers 57L, 57R. The left and right speed control levers 56L, 56R move over the range of from [1] through [2] to [3]. Here, as in the first preferred embodiment, the position [1] will be called the 'no braking point' at the beginning of the movement range; the position [2] will be called the 'full braking point', part-way through the movement range; and the position [3] will be called the 'movement range end point'.

The reference numerals 50L and 50R denote left and right compression springs urging the left and right speed control levers 56L, 56R toward the position [1] (the position shown with solid lines). The springs urging the left and right speed control levers 56L, 56R toward the position [1] (the position shown with solid lines) do not have to be compression springs, and alternatively for example torsion springs can be fitted to the swing shafts 56a, 56a.

Figure 12B:
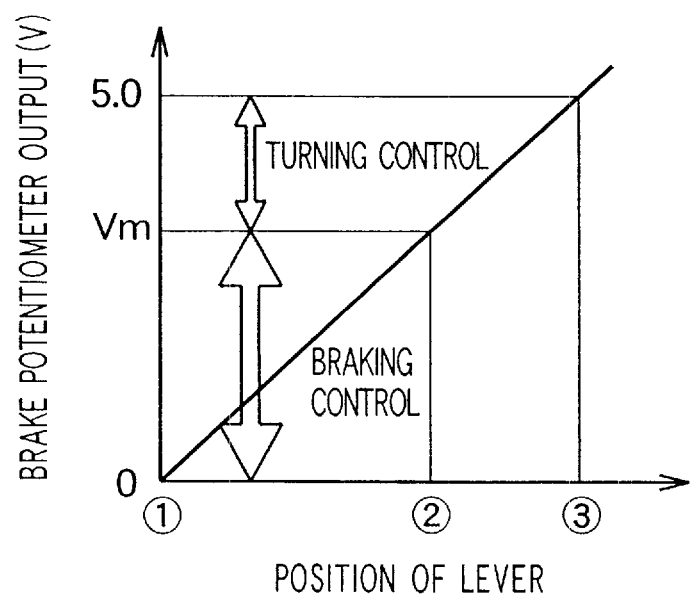
FIG. 12B is a graph equivalent to the graph of FIG. 4B.

FIG. 12B is a graph showing distance moved by the left and right speed control levers 56L, 56R on the horizontal axis and output of the brake potentiometers 57L, 57R on the vertical axis. In this example, 0 volts on the vertical axis is assigned to the no braking point [1] on the horizontal axis; Vm volts on the vertical axis to the full braking point [2] on the horizontal axis; and 5.0 volts on the vertical axis to the movement range end point [3] on the horizontal axis. Vm is a voltage satisfying 0<Vm<5.0, and is set to for example 1.5 volts, 2.0 volts or 2.5 volts.

As a result, the range 0 to Vm volts on the vertical axis is a braking control range, and the range Vm to 5.0 volts on the vertical axis is a turning control range. And in FIG. 12A also, from position [1] (the start point of the movement range of the lever) to position [2] (part-way through the movement range of the lever) corresponds to braking control and from position [2] (part-way through the movement range of the lever) to position [3] (the end point of the movement range of the lever) corresponds to turning control.

The operation of the snow remover 40 will now be explained, on the basis of FIG. 11 and FIGS. 12A and 12B.

When the left speed control lever 56L is operated between [1] and [2] in FIG. 12A, on the basis of the output voltage BKLV of the brake potentiometer 57L connected to this, a signal is outputted from the control unit 52 shown in FIG. 11 to a left brake driver 58L, and the left brake driver 58L brake-controls the left brake 74L.

Between [1] and [2] on the horizontal axis shown in FIG. 12B, a level of braking is changed proportionally in correspondence with the position of the left speed control lever 56L, or specifically the degree of gripping of the left speed control lever 56L. As a result, the snow remover 40 can make a pivot turn to the left by the left crawler belt 41L stopping while the right crawler belt 41R is driven. In other words, the snow remover 40 can make a pivot turn in the opposite direction to that made by the electric dolly 10 in FIGS. 8A and 8B.

Similarly, when the right speed control lever 56R is operated between [1] and [2] in FIG. 12A, on the basis of the output voltage BKRV of the right brake potentiometer 57R connected to this, a signal is outputted from the control unit 52 to a right brake driver 58R and the right brake driver 58R brake-controls the right brake 74R.

Between [1] and [2] on the horizontal axis shown in FIG. 12B, a level of braking is changed proportionally in correspondence with the position of the right speed control lever 56R, or specifically the degree of gripping of the right speed control lever 56R. As a result, the snow remover 40 can make a pivot turn to the right by the right crawler belt 41R stopping while the left crawler belt 41L is driven. In other words, the snow remover 40 can make a pivot turn in the same direction as that made by the electric dolly 10 in FIGS. 8A and 8B.

As in the first preferred embodiment, the control unit 52 takes in the output voltage ACCV of the accelerator potentiometer 26 and controls (the speeds and directions of) the left and right electric motors 71L, 71R by way of the left and right motor drivers 29L, 29R (the same as in the first preferred embodiment).

Also, by gripping the left speed control lever 56L or the right speed control lever 56R deeply between [2] and [3] in FIG. 12A, it is possible to make the snow remover 40 execute a 'spot' left or right turn, which is different from a pivot turn (i.e. a turn executed by braking one of the crawlers).

By reversing rather than stopping the respective crawler belt 41L or 41R between [2] and [3] on the horizontal axis in FIG. 12B it is possible to make the snow remover 40 execute a spot turn in the same way as the electric dolly 10 shown in FIGS. 7A through 7C.

The method for controlling the left and right electric motors 71L, 71R and the left and right brakes 74L, 74R when the left and right speed control levers 56L, 56R are operated is the same as that shown by the flow chart of FIG. 6 discussed in the first preferred embodiment.

With the snow remover 40 of this second preferred embodiment, as with the electric dolly 10 of the first preferred embodiment, left and right speed control levers 56L, 56R are provided alongside left and right grips 48L, 48R and a left brake 74L and a left electric motor 71L are controlled with the left speed control lever 56L and a right brake 74R and a right electric motor 71R are controlled with a right speed control lever 56R.

By means of this construction it is possible to obtain the same effects as those of the electric dolly 10 of the first preferred embodiment. That is, a driver can operate the speed control levers 56L, 56R while gripping the left and right grips 48L, 48R. As a result, while keeping the snow remover 40 in a good attitude by gripping the left and right grips 48L, 48R it is possible to execute a direction change or turn of the snow remover 40 with the left and right speed control levers 56L and 56R, and consequently the snow remover 40 can be driven in a weaving line in a stable state.

Also, because the driver can operate the left and right speed control levers 56L, 56R while still gripping the grips 48L and 48R, the driver can operate the left and right speed control levers 56L, 56R easily just with the fingers, without moving either hand. As a result of this, because the driver can operate the left and right speed control levers 56L, 56R with a natural operating feeling (without great effort), driver fatigue is lessened.

Although in the first and second preferred embodiments described above an electric dolly 10 and a rotary snow remover 40 were used as examples of electric vehicles according to the invention, an electric vehicle according to the invention may alternatively be some other utility vehicle such as a mowing machine, a dozer or a cultivator, and there is no particular restriction on the type of the electric vehicle.

And although in the first and second preferred embodiments an example of the control of the left and right electric motors and the left and right brakes carried out when the left and right speed control levers are operated was described using the flow chart of FIG. 6, the method of controlling the left and right electric motors and the left and right brakes is not limited to this. In short, any method by which it is possible to control the left and right electric motors and the left and right brakes so that the vehicle can change direction and turn when the left and right speed control levers are operated will suffice.

Figure 13A:
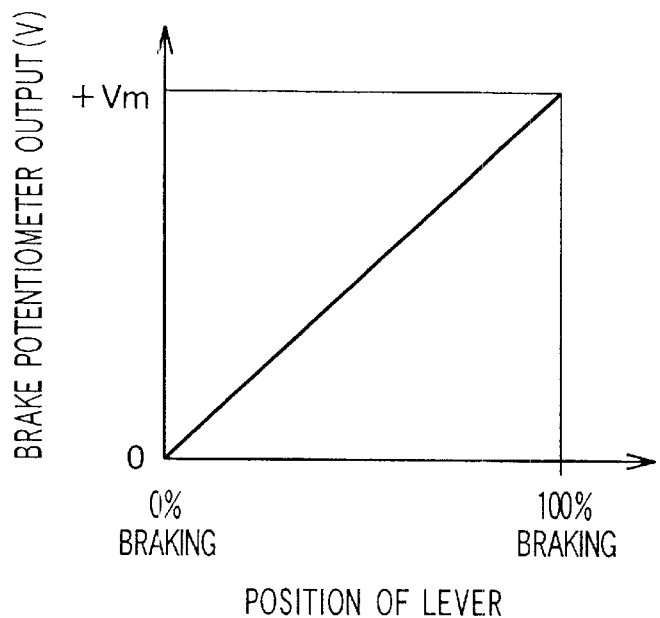
FIGS. 13A and 13B are graphs showing the relationship between the position in the braking range of a speed control lever shown in FIG. 4B or 12B and the output voltage of the brake potentiometer.
Figure 13B:
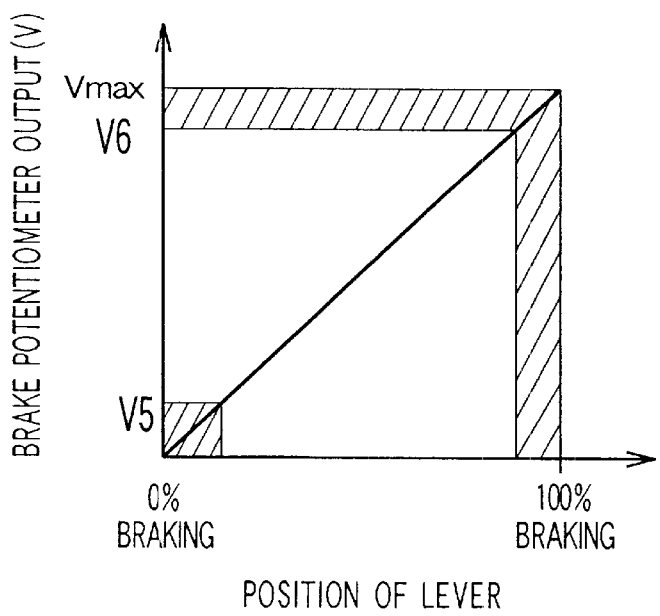

FIGS. 13A and 13B are graphs showing the braking control range of the speed control lever shown in FIG. 4A and showing the relationship between the position of the lever shown in FIG. 4B and the output of the respective brake potentiometer 27L or 27R.

FIG. 13A shows that with the output range of the brake potentiometers 27L, 27R made 0 to Vm volts, 0 volts has been assigned to 0% braking and +Vm volts has been assigned to 100% braking (full braking). As mentioned with reference to FIG. 4B, Vm is for example 1.5 volts, 2.0 volts or 2.5 volts.

FIG. 13B is a graph obtained by generalizing FIG. 13A and processing it for the purposes of the control of this invention, and shows 0 volts assigned to 0% braking and Vmax volts assigned to 100% braking.

When the driver sets the left or right speed control lever 23L or 23R to the vicinity of 100% braking, because it is the intention of the driver to invoke full braking, the control correction to be carried out in this invention will not be applied. Accordingly, in FIG. 13B, the region between V6 and Vmax (shown with hatching in the figure) on the vertical axis is made a non-control region.

And when the driver sets the left or right speed control lever 23L or 23R to the vicinity of 0% braking, because it is the intention of the driver not to invoke braking, the control correction to be carried out in this invention will not be applied. Accordingly, in FIG. 13B, the region between 0 and V5 (hatched) on the vertical axis is made a non-control region.

That is, in FIG. 13B, the control of this invention is executed in the region of V5 to V6 on the vertical axis.

Figure 14A:
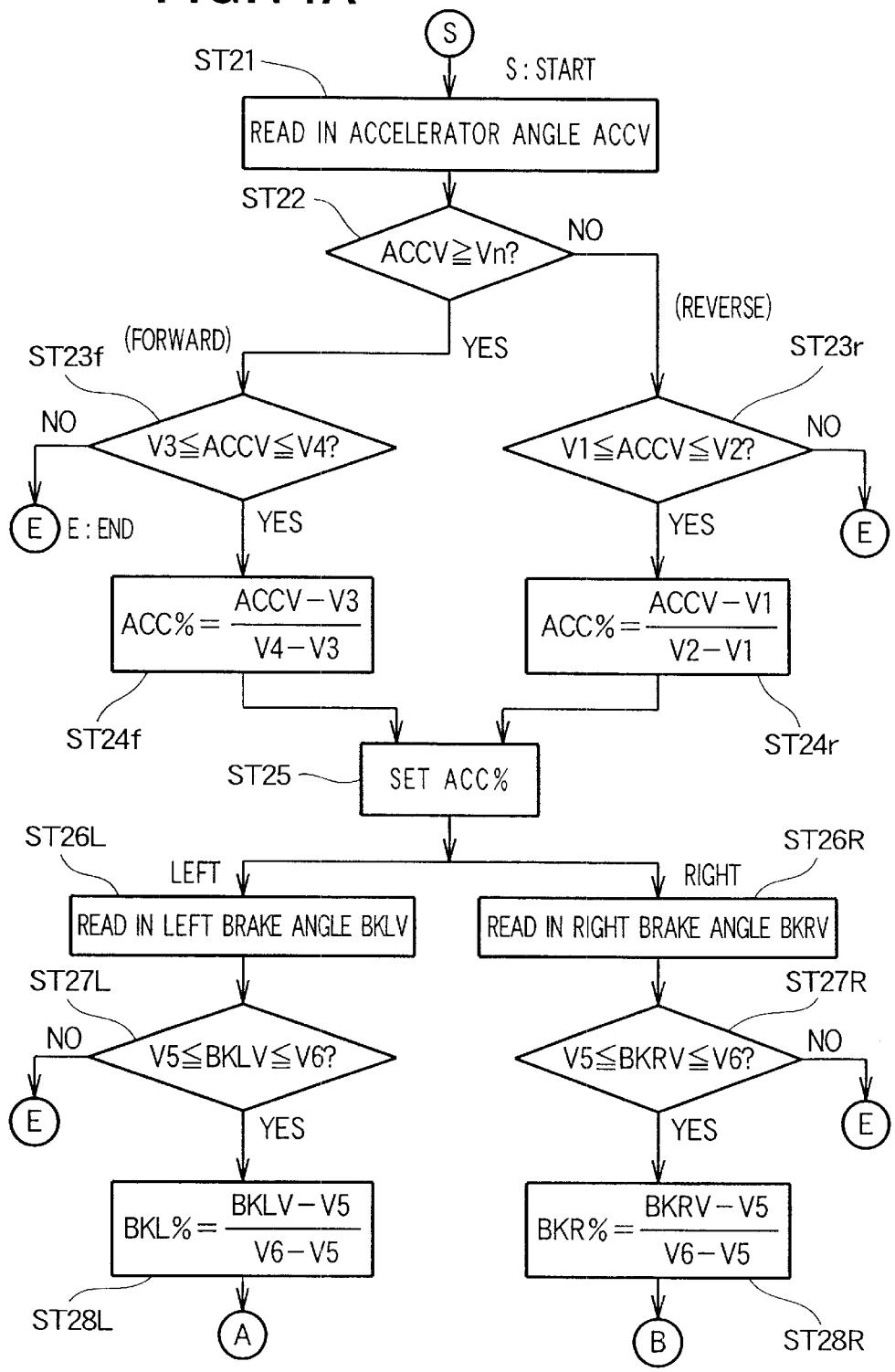
FIGS. 14A and 14B are flow charts showing turning control executed by the control unit.
Figure 14B:
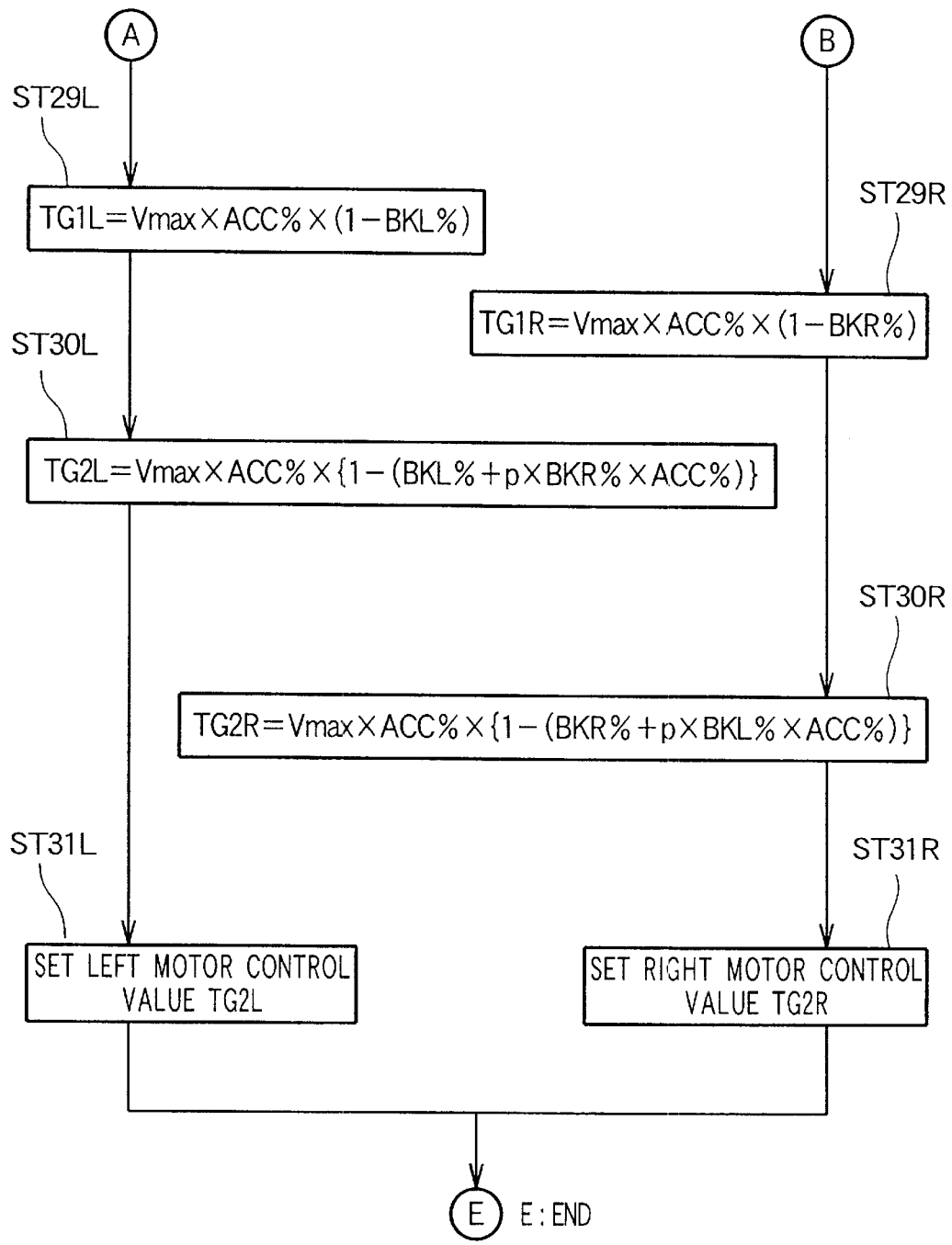

FIGS. 14A and 14B show a control flow for the region V5 to V6 on the vertical axis of FIG. 13B in the control unit 24 shown in FIG. 5. For convenience, this single control flow is divided between FIGS. 14A and 14B.

ST21:

The accelerator angle (the output voltage of the accelerator potentiometer) ACCV is read in.

ST22:

It is determined whether or not the accelerator angle ACCV read in is greater than a neutral voltage Vn. As shown in FIG. 2C, an accelerator angle ACCV greater than the neutral voltage Vn can be regarded as 'forward' and an accelerator angle ACCV less than the neutral voltage Vn can be regarded as 'reverse'. When the determination is YES then processing proceeds to ST23*f*, and when it is No then processing proceeds to ST23*r*.

ST23*f*:

If the determination of ST22 is YES, it is determined whether or not the accelerator angle ACCV is within the voltage range V3 to V4 shown in FIG. 2C. As shown in FIG. 2C the voltage range V3 to V4 is a control range and voltages outside this range are in a non-control range. Accordingly, if the determination is NO, processing ends.

ST24*f*:

If the accelerator angle ACCV is in the voltage range V3 to V4, the proportion of this range corresponding to ACCV (an accelerator percentage ACC %) is calculated. The formula for this calculation is: acceleration percentage ACC %=(ACCV−V3)/(V4−V3).

ST23r:

If the determination of ST22 is NO, it is determined whether or not the acceleration angle ACCV is in the voltage range V1 to V4. As shown in FIG. 2C, the voltage range V1 to V2 is a control range, and voltages outside this range are in a non-control range. Accordingly, if the determination is No, processing ends.

ST24r:

If the accelerator angle ACCV is in the voltage range V1 to V2, the proportion of this range corresponding to ACCV (an accelerator percentage ACC %) is calculated. The formula for this calculation is: acceleration percentage ACC %=(ACCV−V1)/(V2−V1).

ST25:

An acceleration percentage ACC % is determined on the basis of ST24f or ST24r.

ST26L:

The left brake angle (the output of the left brake potentiometer) BKLV is read in.

ST27L:

It is checked whether or not the BKLV read in is in the voltage range V5 to V6. In FIG. 13B, the voltage range V5 to V6 is the control range, and voltages outside this range are in a non-control range; therefore, if the determination is NO, processing ends.

ST28L:

If the determination of ST27 is YES, the proportion of the range (V5 to V6) corresponding to BKLV (a left brake percentage BKL %) is calculated. The formula for this calculation is: left brake percentage BKL %=(BKLV−V5)/(V6−V5).

In the same way, the following steps are carried out for the right brake.

ST26R:

The right brake angle (the output of the right brake potentiometer) BKRV is read in.

ST27R:

It is checked whether or not the BKRV read in is in the voltage range V5 to V6. In FIG. 13B, the voltage range V5 to V6 is the control range, and voltages outside this range are in a non-control range; therefore, if the determination is NO, processing ends.

ST28R:

If the determination of ST27 is YES, the proportion of the range (V5 to V6) corresponding to BKRV (a right brake percentage BKR %) is calculated. The formula for this calculation is: right brake percentage BKR %=(BKRV−V5)/(V6−V5).

ST29L (FIG. 14B):

On the basis of the Vmax shown in FIG. 2C, the ACC % determined in ST25 and the BKL % calculated in ST28L, the following calculation is carried out: TG1L=Vmax×ACC %×(1−BKL %).

When the left brake angle BKLV is large, it is wasteful to supply much power to the left motor, and the supply of power to the left motor should be reduced.

When the left brake angle BKLV is large, according to ST08L, BKL % becomes a large value close to 1.0, and (1−BKL %) becomes a small value close to 0. By multiplying this (1−BKL %) by (Vmax×ACC %), it is possible to set a corrected accelerator angle which takes into account the left brake angle.

It is beneficial to take into account the left brake angle like this when determining the voltage for controlling the left motor. However, if the right brake angle is large, it is desirable to lower the left motor control voltage more. If on the other hand the right brake angle is small, its influence on the left motor can be ignored.

It is preferable to take into account both the left brake angle and the right brake angle like this when determining the voltage for controlling the left motor.

In this connection, the replacement of the last term of ST29L, BKL %, with (BKL %+p×BKR %×ACC %) will now be studied. BKR % is the value obtained in ST28R.

When the left motor is considered, the influence of the right brake is likely to become more marked the larger is the acceleration angle ACC %. Therefore, the right brake angle BKR % will be multiplied by ACC %. And because when BKR % is directly added to BKL % the influence of the right brake angle BKR % becomes too strong, it will be multiplied by a coefficient p of 0.3 to 0.5.

From this it can be seen that it is appropriate to replace the last term BKL % of ST29L with (BKL %+p×BKR %×ACC %). This (BKL %+p×BKR %×ACC %) will be called the corrected left brake percentage.

ST30L:

A corrected value TG2L (left motor control value) of TG1L is calculated using the following formula: TG2L=Vmax×ACC %×{1−(BKL %+p×BKR %×ACC %)}.

ST31L:

Because a corrected left motor control value TG2L has been determined, the left motor is operated in accordance with this TG2L.

ST29R and ST30R are the same as ST29L and ST30L but with the L replaced with R and hence, the explanation thereof is omitted.

ST31R:

Because a corrected right motor control value TG2R has been determined, the right motor is operated in accordance with this TG2R.

In this invention the accelerator levers and speed control levers do not have to be levers in a narrow sense, and may alternatively be dial switches, sliding switches or any other means by which it is possible to set a value manually.

Electric motor control pertaining to a third preferred embodiment of the invention will now be described, on the basis of FIG. 15 and FIGS. 16A through 16C.

ST21 through ST31L and ST31R of the flow chart shown in FIGS. 14A and 14B are control flows good for normal control, and generally the electric motors are controlled directly on the basis of the accelerator angle. However, in electric motor control pertaining to this third preferred embodiment, for example in control of the left electric motor, when the left brake angle is large the left electric motor control value is lowered, and when the right brake angle is large this is also taken into account and the left motor control value is lowered further. And the same control is carried out for the right electric motor. As a result, the waste of rotating an electric motor at a high speed while applying a brake is avoided. Also, whereas ordinarily it sometimes happens that the vehicle shakes due to an unbalance between the actions of the left and right electric motors, in this third preferred embodiment, because for example with respect to the left electric motor not only the left brake angle but also the right brake angle is taken into account, there is no risk of this happening, and the control feeling and straight-forward characteristic of the vehicle improve. This will now be explained in detail.

Figure 15:
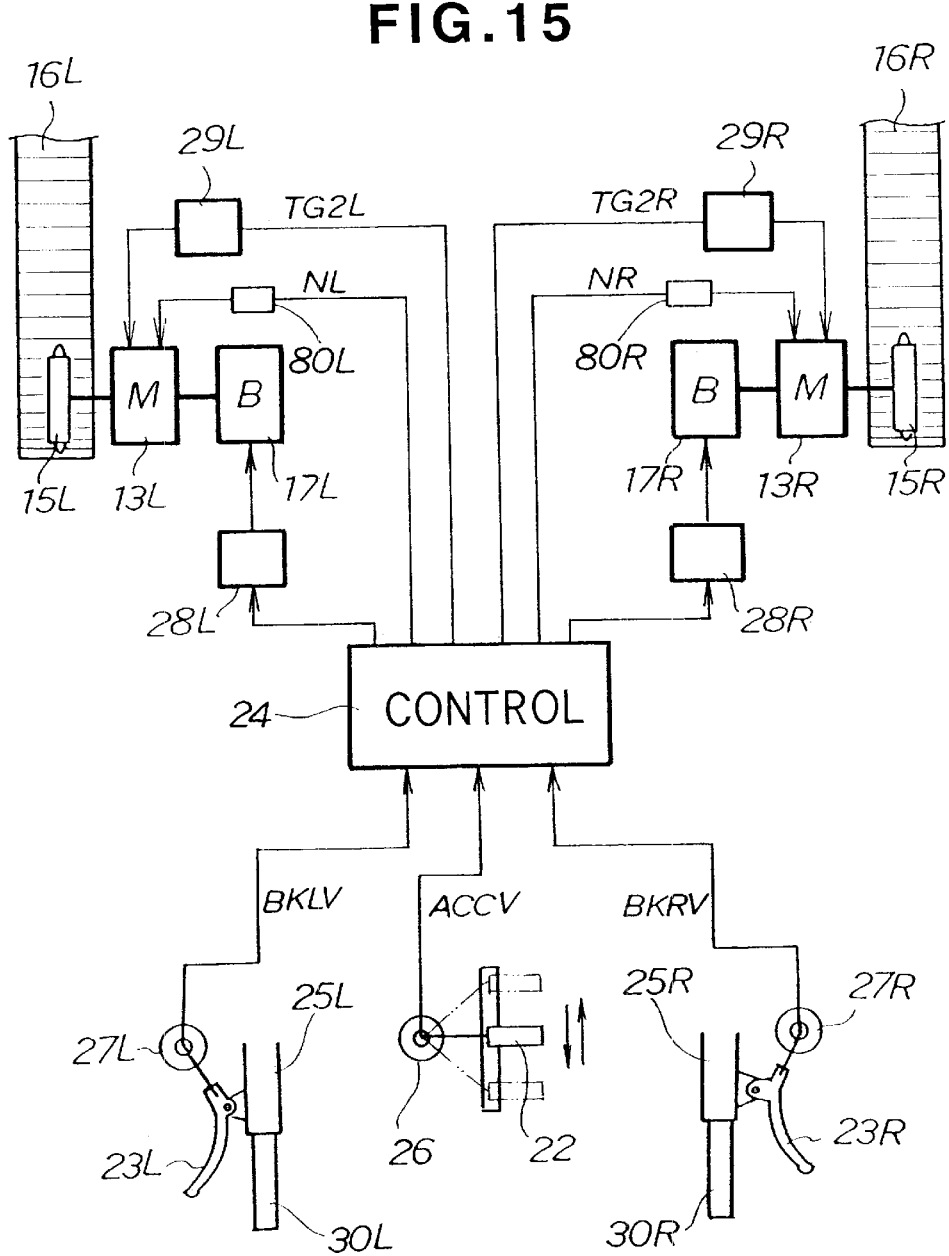
FIG. 15 is a control system diagram, corresponding to FIG. 5, of an electric vehicle according to a third preferred embodiment.

FIG. 15 is a system view corresponding to FIG. 5, and differs from FIG. 5 in that there are provided speed detectors for detecting the speeds NL of the left electric motor 13L. The other construction elements are the same as those shown in FIG. 5 and have been assigned the same reference numerals as in FIG. 5 and hence, the explanation thereof is omitted.

Figure 16A:
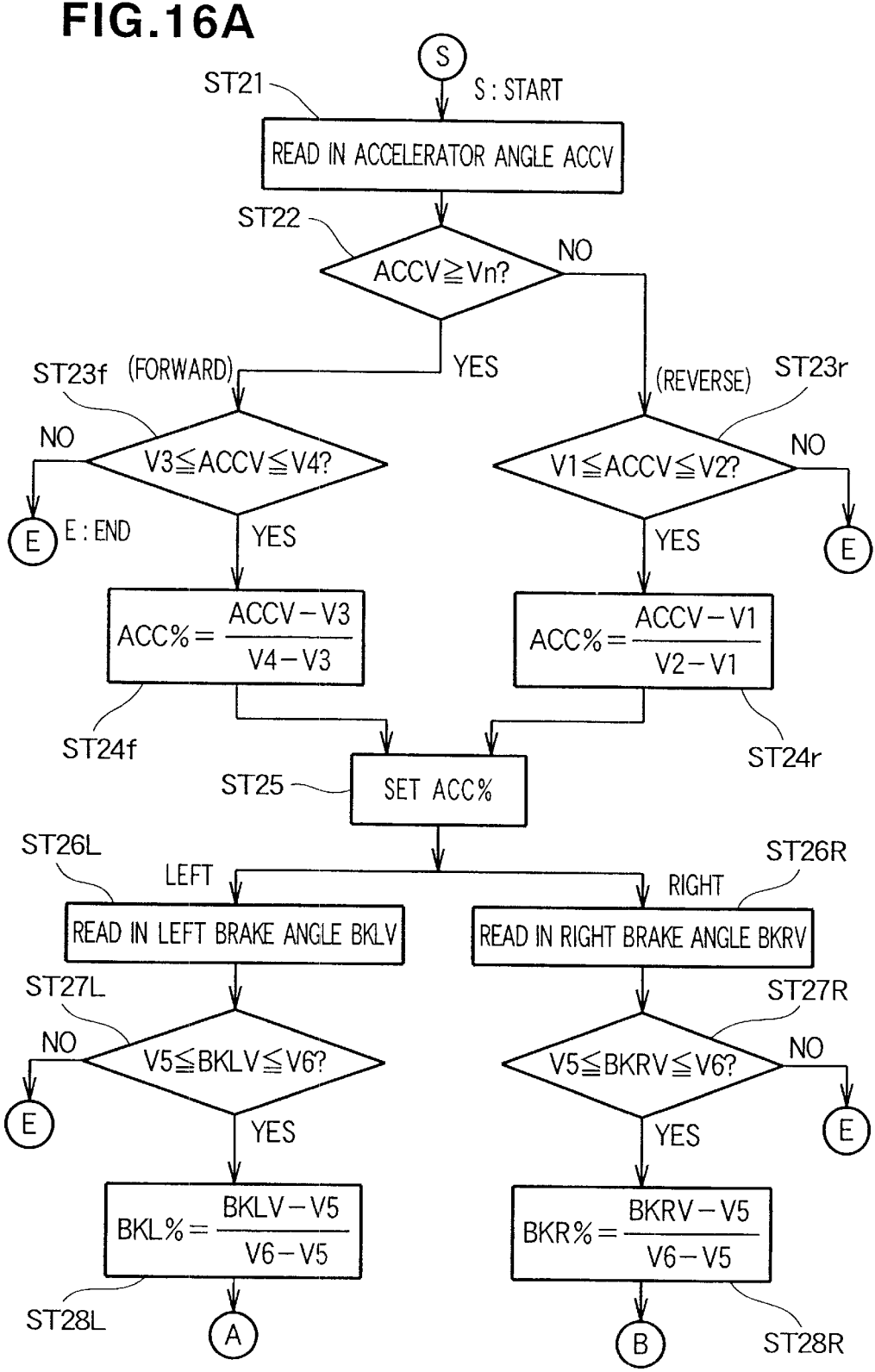
FIGS. 16A through 16C are flow charts showing control carried out by a control unit shown in FIG. 15.
Figure 16B:
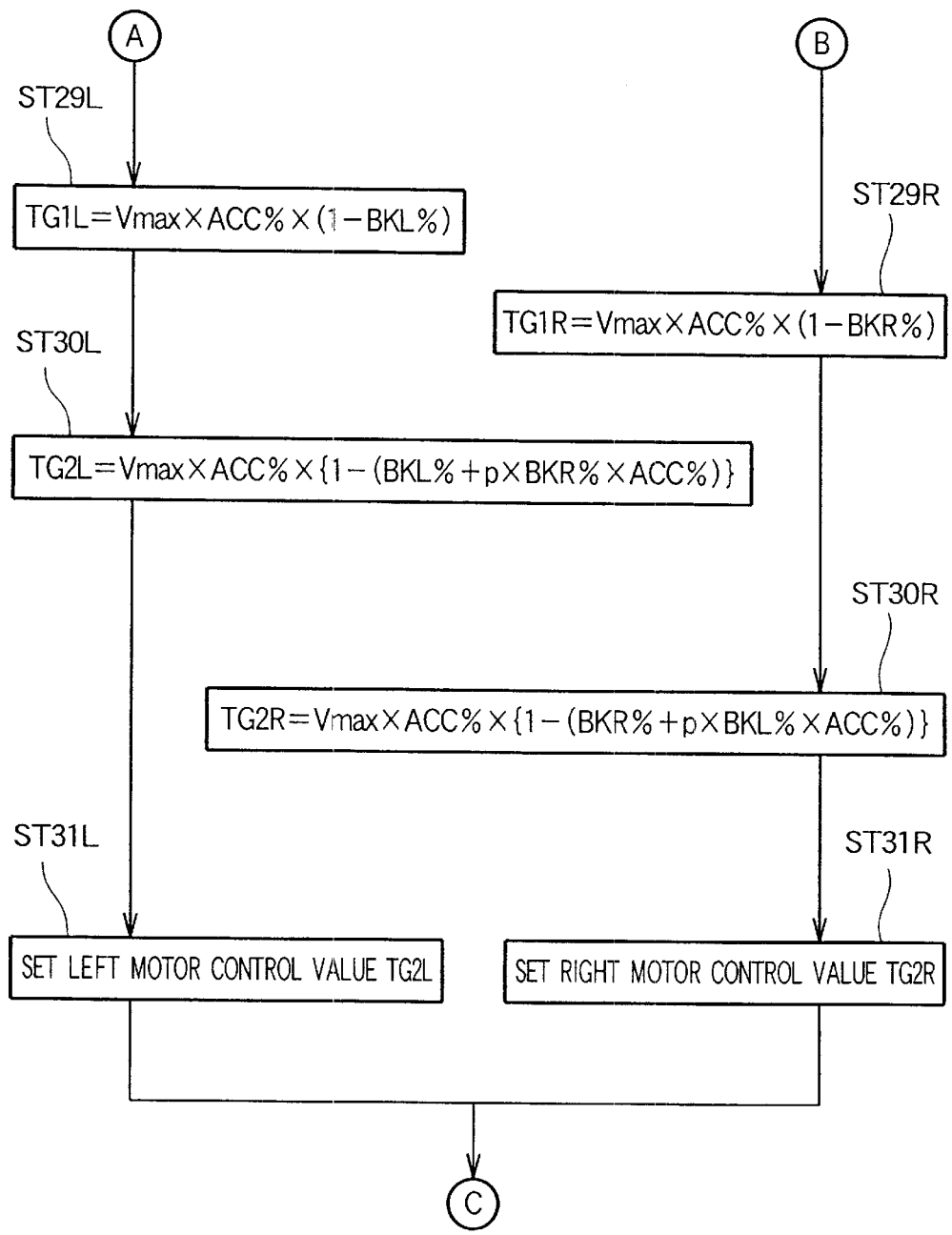
Figure 16C:
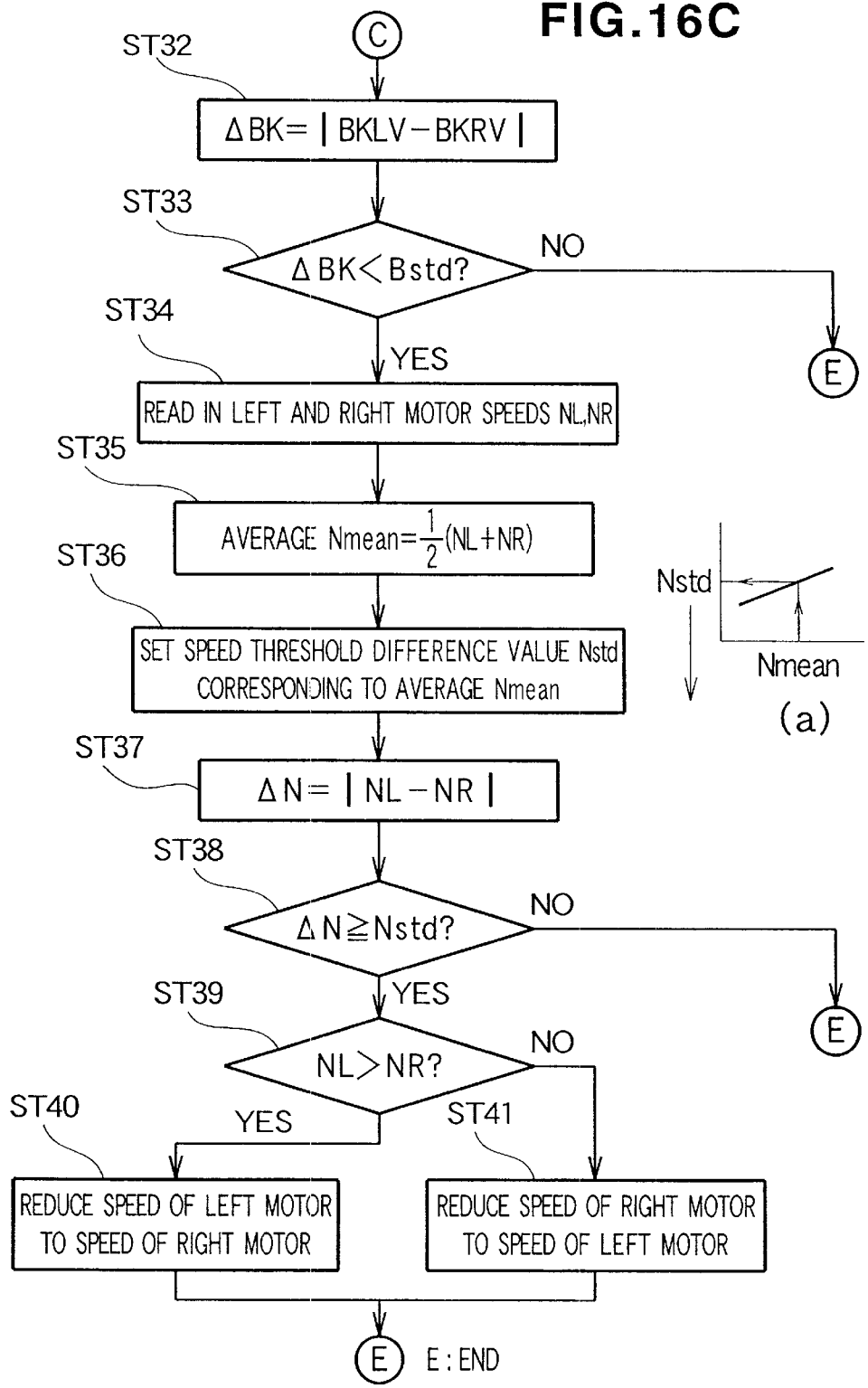

FIGS. 16A through 16C show a sequence of control flow pertaining to the third preferred embodiment. For convenience, this single control flow has been divided between FIGS. 16A, 16B and 16C. The control flow shown in FIG. 16A is the same as the control flow shown in FIG. 14A, and the control flow shown in FIG. 16B is the same as the control flow shown in FIG. 14B; accordingly, the same step numbers have been assigned as in FIGS. 14A and 14B and a duplicate explanation of FIGS. 16A and 16B will not be given.

The control flow shown in FIG. 16C, which continues from C in FIG. 16B, will now be explained.

ST32:

To check whether or not there is a requirement for straight-line control during normal running, first a braking difference $\Delta BK$ (=|BKLV−BKRV|) is calculated. BKLV is the left brake angle read in at ST26L shown in FIG. 16A, and BKRV is the right brake angle read in at ST26R.

ST33:

To check whether or not the left and right brakes are the same or almost the same, a brake threshold value Bstd below which the left and right braking angles can be regarded as substantially the same is predetermined. Then, it is determined whether or not the braking difference $\Delta BK$ obtained in ST32 is less than the threshold value Bstd. If the determination is NO, then because there is a difference between the left and right braking angles, the processing ends.

ST34:

If the determination of ST33 is YES, then because the left and right braking angles are essentially the same, for control to proceed further the speeds NL, NR (see FIG. 15) of the left and right electric motors are read in.

ST35:

The average Nmean of the left and right electric motor speeds NL, NR is calculated.

ST36:

A speed difference threshold value Nstd corresponding to the average Nmean obtained in ST35 is determined from the graph (a) shown in FIG. 16C. The higher is the speed, the more marked is the left-right speed difference. At low speeds the speed difference is small. Accordingly, the threshold value used for the determination (the speed difference threshold value Nstd) is determined in correspondence with the speed.

ST37:

The speed difference $\Delta N$ (=|NL−NR|) is calculated.

ST38:

It is checked whether the speed difference $\Delta N$ obtained in ST37 is above the speed difference threshold value Nstd. If NO, then there is no great speed difference between the left and right electric motors. That is, because there is no risk of the vehicle turning even when left, control ends. In ST33 the brake angle difference was checked; however, the brake angle is not completely linked to the speed of the electric motor. Therefore, here the speed difference between the left and right electric motors is checked again.

ST39:

Because there was found to be a harmful speed difference between the left and right electric motors, it is checked which is at the lower speed.

ST40:

If the determination of ST39 is YES (the left motor speed NL>the right motor speed NR), by speed-reducing control of the left electric motor (reducing the power supplied to the left electric motor) the speeds of the left and right electric motors are made substantially the same. By this means the straight-forward characteristic of the electric vehicle can be improved.

ST41:

If the determination of ST39 is NO (the left motor speed NL<the right motor speed NR), the speeds of the left and right electric motors are made the same by speed-reducing control of the right electric motor (reducing the power supplied to the right electric motor). By this means also the straight-forward characteristic of the electric vehicle can be improved.

By the execution of the above steps ST32 through ST41, only when the left and right braking angles are the same or substantially the same, control to match the speeds of the left and right electric motors is carried out. In this way, it is possible to improve the straight-forward characteristic without being influenced by the path condition. And, it is the higher speed that is adjusted to match the lower speed. This is because when one of the driving wheels has mounted an irregularity in the path surface or a slope, lowering the speed makes it is easier to stabilize the vehicle body.

Figure 17:
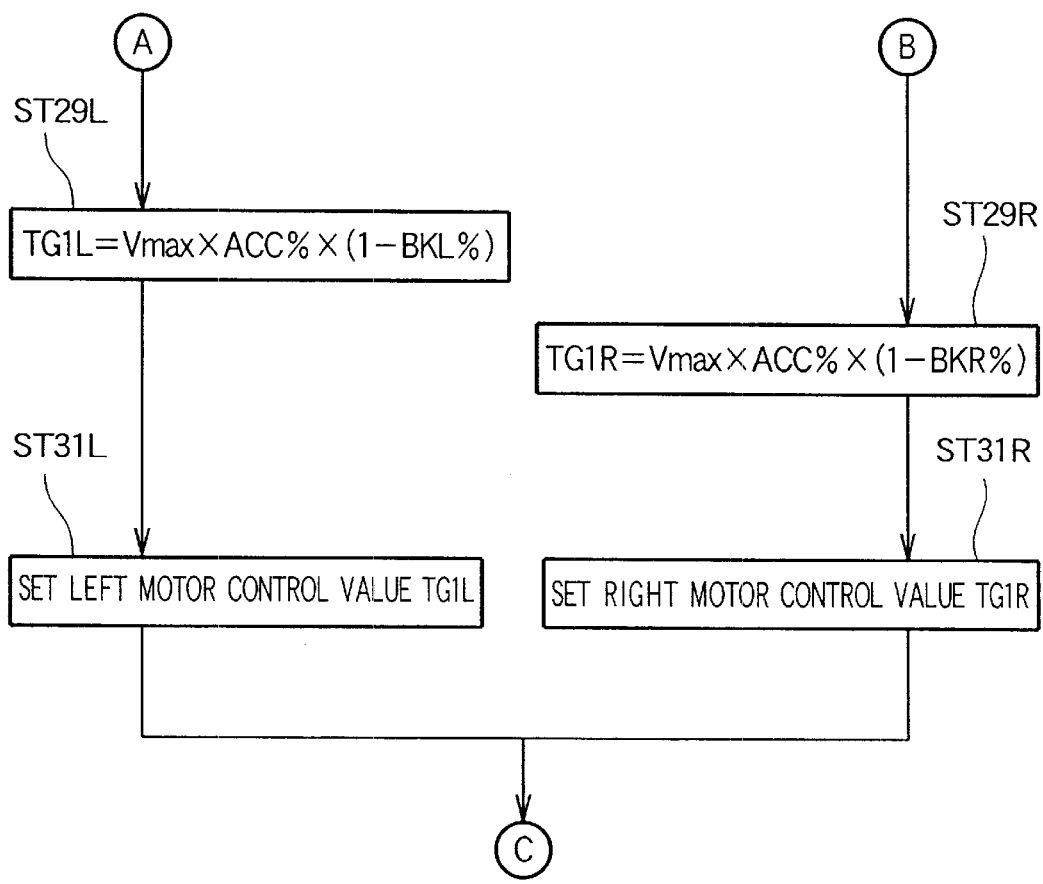
FIG. 17 is flow chart showing a variation of the control flow shown in FIG. 16B.

FIG. 17 shows a variation of the control flow shown in FIG. 16B, in which ST30L and ST30R of FIG. 16B are dispensed with. As a result of this, in ST31L of FIG. 17 a left motor control value TG1L is determined and in ST31R a right motor control value TG1R is determined. ST29L and ST29R are the same as in FIG. 14B and therefore will not be explained again here. As a result of the omission of ST30L and ST30R of FIG. 16B, the control flow shown in FIG. 17 is extremely simple.

A fourth preferred embodiment of an electric vehicle according to the invention, having an engine-driven utility part at the front of an electric vehicle of the kind discussed above, will now be described.

Figure 18:
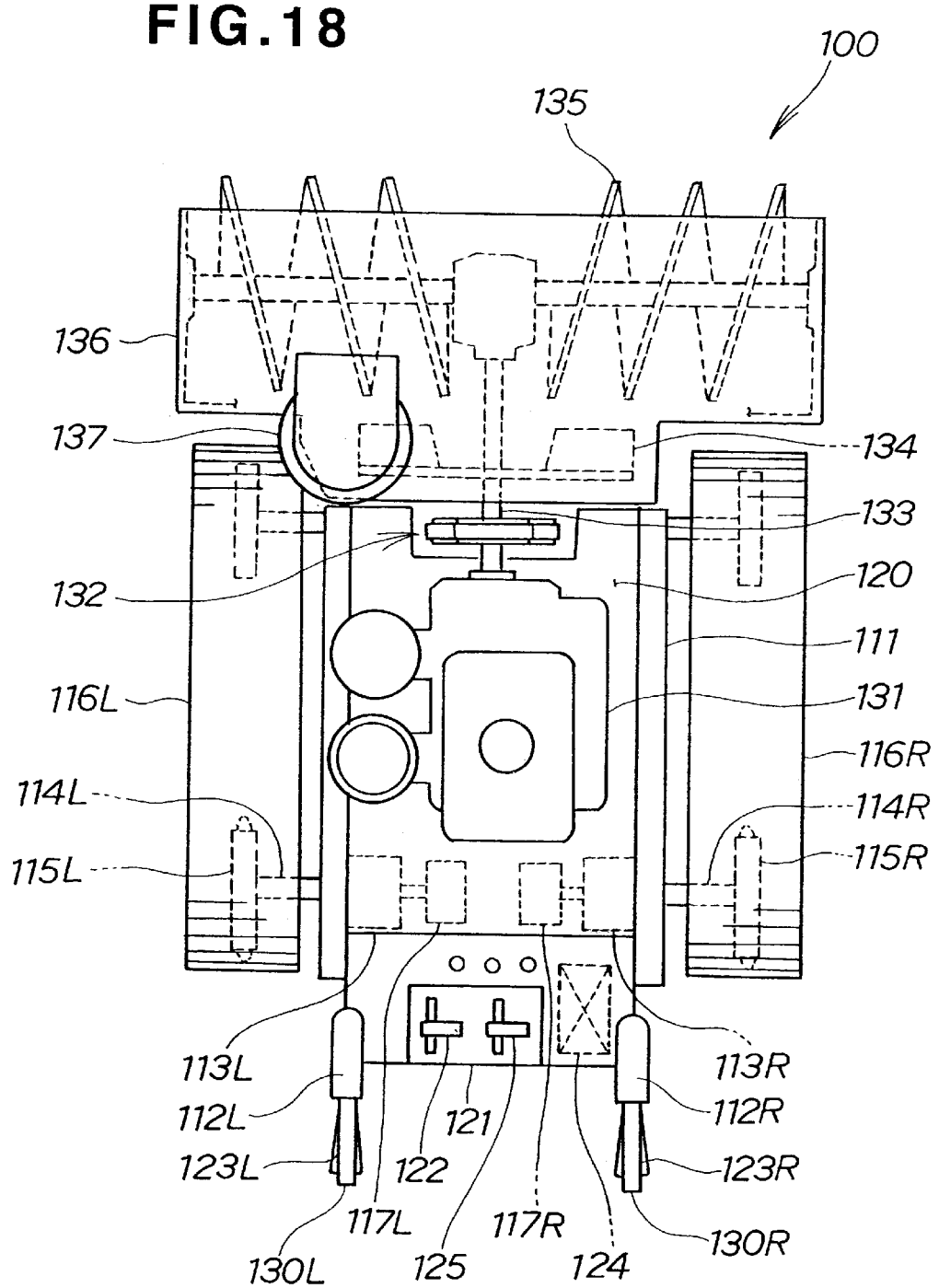
FIG. 18 is a plan view of an electrically-propelled snow-clearer according to a fourth preferred embodiment.

FIG. 18 shows an electrically-propelled utility machine according to a fourth preferred embodiment. In FIG. 18, an electrically-propelled snow-clearer 100 serving as an example of an electrically propelled utility machine has left and right electric motors 113L, 113R powered by a battery (not shown) mounted on a vehicle body frame (vehicle body) 111. The electric motors 113L, 113R are rotationally driven by left and right drive shafts 114L, 114R. Left and right crawlers 116L, 116R are driven by driven wheels 115L, 115R mounted on the ends of these drive shafts 114L, 114R. The left and right driven wheels 115L, 115R are braked by the operation of left and right brakes 117L, 117R. A machine platform 120 is provided on the vehicle body frame 111. A control panel 121 is provided on the rear of the machine platform 120. This control panel 121 has a single accelerator lever 122 and a single throttle lever 125. Left and right operating handles 112L, 112R extend rearward from the rear of the control panel 121. Left and right grips 130L, 130R are provided at the rear ends of the left and right operating handles 112L, 112R. A left speed control lever 123L for controlling the left brake 117L and the left electric motor 113L is provided alongside the left grip 130L. A right speed control lever 123R for controlling the right brake 117R and the right electric motor 113R is provided alongside the right grip 130R.

A driver does not ride the vehicle but walks behind it and advances, reverses, turns and stops it by operating the levers on the control panel 121 (including the accelerator lever 122, the throttle lever 125 and the left and right speed control levers 123L, 123R).

A blower 134 and an auger 135, constituting utility tools, are driven by an engine 131 serving as a drive source. The engine 131 is mounted on the machine platform 120, and rotationally drives the blower 134 and the auger 135 by way of a clutch 132 and a tool shaft 133. Adjustment of the speed of the engine 131 is carried out by means of the throttle lever 125. The reference number 136 denotes an auger housing, and 137 a snow-throwing chute.

The left and right electric motors 113L, 113R, the left and right driven wheels 115L, 115R and the left and right brakes 117L, 117R constitute a 'transit system' of the electrically-propelled snow-clearer 100. This transit system propels forward and backward and turns the electrically-propelled snow-clearer 100. The engine 131, the clutch 132, the blower 134 and the auger 135 make up a 'utility system'. This utility system performs snow-clearing work.

The reference number 124 denotes a control unit, and this control unit 124 controls en bloc the left and right electric motors 113L, 113R and the left and right brakes 117L, 117R on the basis of the positions of the accelerator lever 122 and the left and right speed control levers 123L, 123R.

The left and right brakes 117L, 117R may be electromagnetic brakes which apply a braking force through an electromagnetic action; hydraulic brakes which grip a disc with a hydraulic pressure; mechanical brakes which clamp a drum with a band; regenerative brakes; or equivalent brakes of some other form or type.

Figure 19A:
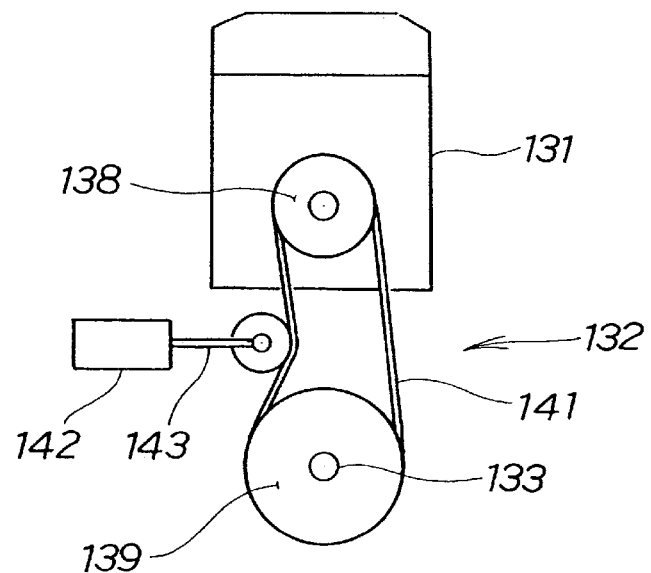
FIGS. 19A and 19B are schematic views illustrating the working principle of a clutch shown in FIG. 18.
Figure 19B:
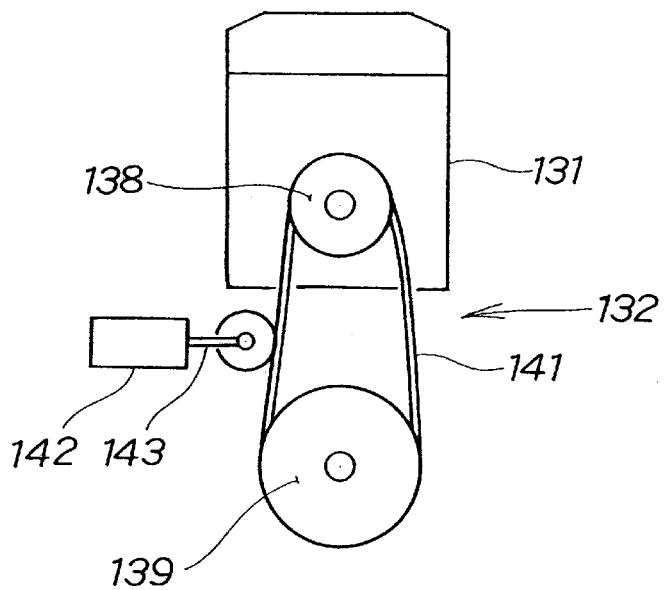

FIGS. 19A and 19B are views illustrating the working principle of the clutch shown in FIG. 18.

As shown in FIG. 19A, the clutch 132 has a drive pulley 138 attached to the output shaft of the engine 131; a driven pulley 139 attached to the tool shaft 133; a belt 141 passing around these pulleys 138, 139; and a clutch cylinder 142 for tensioning and loosening the belt 141. When a piston rod 143 of the clutch cylinder 142 is protruded, the belt 141 is tensioned, whereupon the clutch 132 assumes an ON-state and power is transmitted from the drive pulley 138 to the driven pulley 139.

And referring to FIG. 19B, when the piston rod 143 of the clutch cylinder 142 is retracted, the belt 141 is loosened, whereupon the clutch 132 assumes an OFF-state and power is not transmitted from the drive pulley 138 to the driven pulley 139.

The action of the accelerator lever 122 used in this preferred embodiment, shown in FIG. 18, is the same as that of the accelerator lever 22 of the first preferred embodiment, shown in FIGS. 2A through 2C, and accordingly will not be explained again here.

Also, the relationships between the speed control levers 123L, 123R shown in FIG. 18 and the outputs of brake potentiometers 127L, 127R (see FIG. 20) are the same as in the graphs of FIGS. 13A and 13B of the first preferred embodiment and accordingly will not be explained again here.

The control system of this electrically-propelled utility machine according to a fourth preferred embodiment of the invention will now be explained, on the basis of FIG. 20.

When the left speed control lever 123L is operated, on the basis of the output voltage of the brake potentiometer 127L connected to this, a left brake driver 128L brakes the left brake 117L.

Similarly, when the right speed control lever 123R is operated, on the basis of the output voltage of the brake potentiometer 127R connected to this, a right brake driver 128R brakes the right brake 117R.

When the throttle lever 125 is shifted, the aperture of a throttle valve 146 disposed between the engine 131 and an intake pipe 144 is adjusted by a throttle driver 145. For example, the more the throttle valve 146 is opened, the higher the speed of the engine 131 becomes. The reference number 147 denotes a speed detector for detecting the speed of the engine 131.

The control unit 124 takes in the output voltage ACCV of an accelerator potentiometer 126, the output voltages BKLV, BKRV of the left and right brake potentiometers 127L and 127R, and the engine speed Ne, and in accordance with a control flow which will be explained later generates a left control voltage TG3L and a right control voltage TG3R and controls the left and right electric motors 113L, 113R by way of left and right motor drivers 129L, 129R.

Figure 21A:
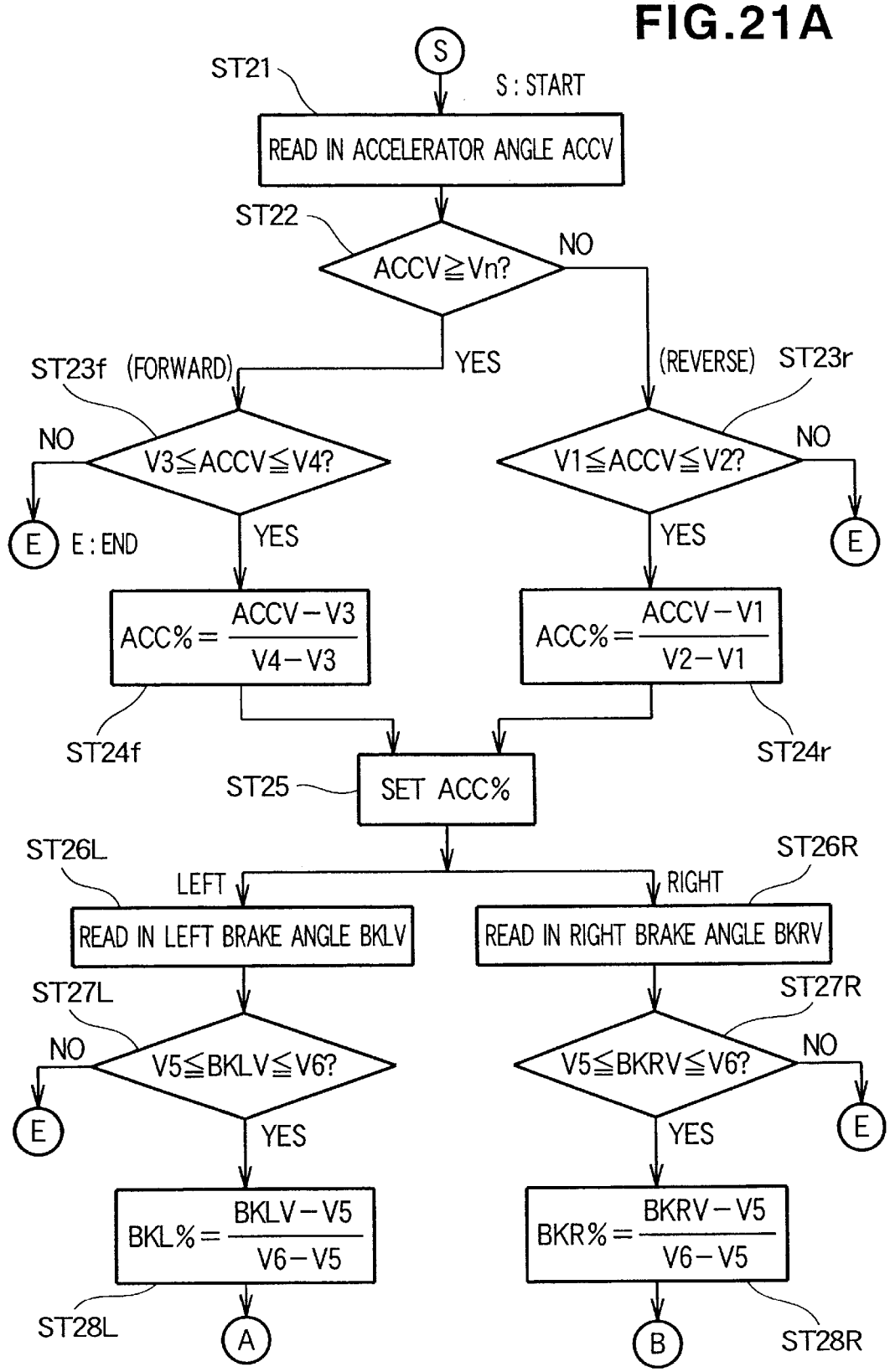
FIGS. 21A through 21C are flow charts showing control carried out by a control unit shown in FIG. 20.
Figure 21B:
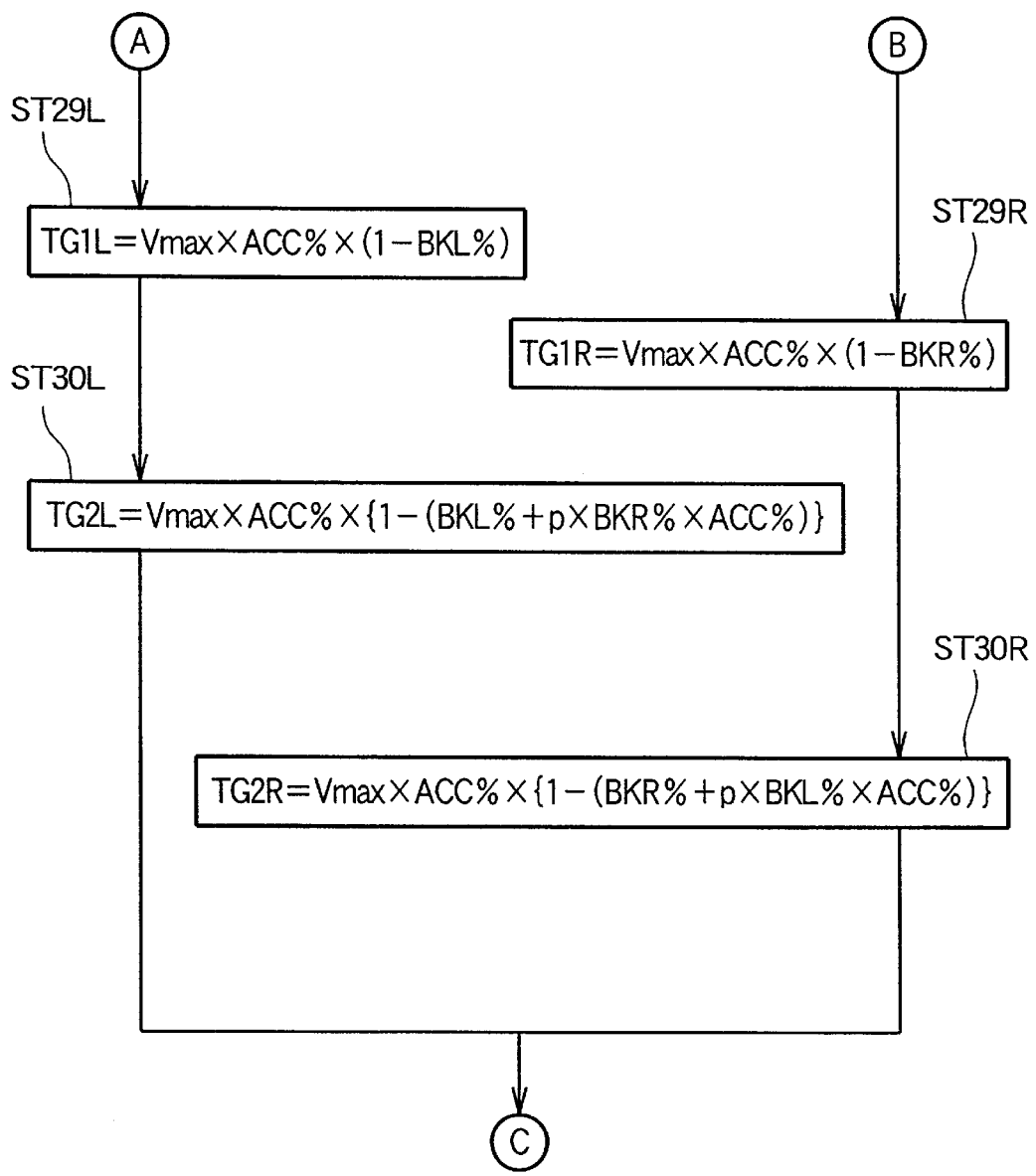
Figure 21C:
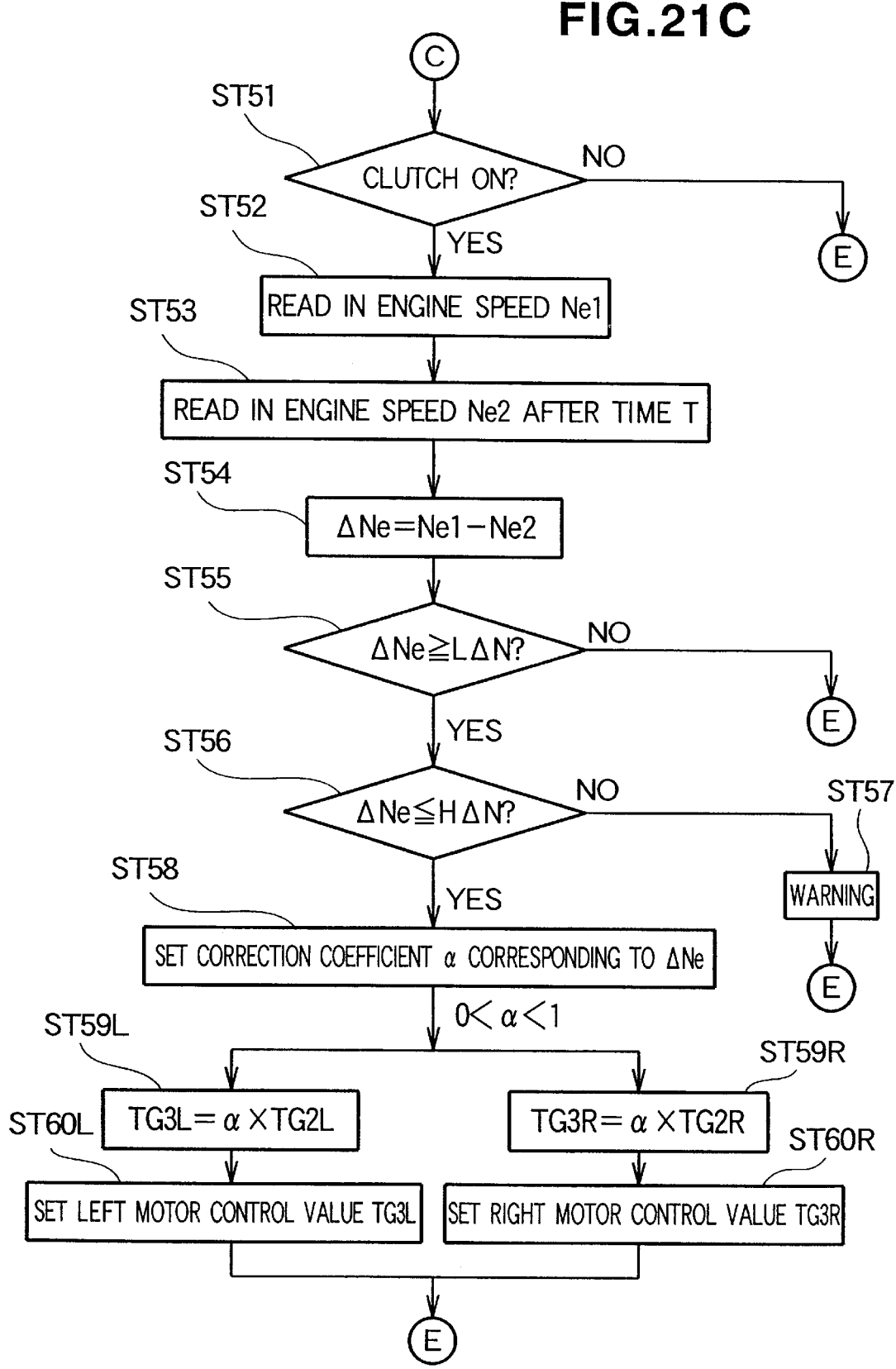

FIGS. 21A through 21C show a single control flow for the electrically-propelled utility machine of this fourth preferred embodiment. For convenience, this single control flow has been divided between FIGS. 21A, 21B and 21C. The control flow shown in FIG. 21A is the same as the control flow shown in FIG. 14A, and therefore will not be explained again here. Also, the control flow shown in FIG. 21B is the same as the control flow shown in FIG. 14B without ST31L and ST31R, and accordingly the same numbers have been assigned as in FIG. 14B and no duplicate explanation will be given here.

The control flow shown in FIG. 21C, which continues from C in FIG. 21B, will now be explained.

ST51:

It is determined whether or not the clutch is ON. If the determination is NO, i.e. if the clutch is OFF, because snow-clearing work is not being carried out, the subsequent control is unnecessary and processing ends.

ST52:

If the determination in ST51 is YES, the engine speed Ne1 is read in.

ST53:

After a time t from when the engine speed Ne1 was read in, the engine speed is read in again. This will be called Ne2. The time t is a short time.

ST54:

The engine speed difference ΔNe (=Ne1−Ne2) is calculated.

Here, the relationship between the engine speed difference ΔNe and a correction coefficient a for correcting the left and right motor control values will be explained, on the basis of graphs shown in FIGS. 22A and 22B.

Figure 22A:
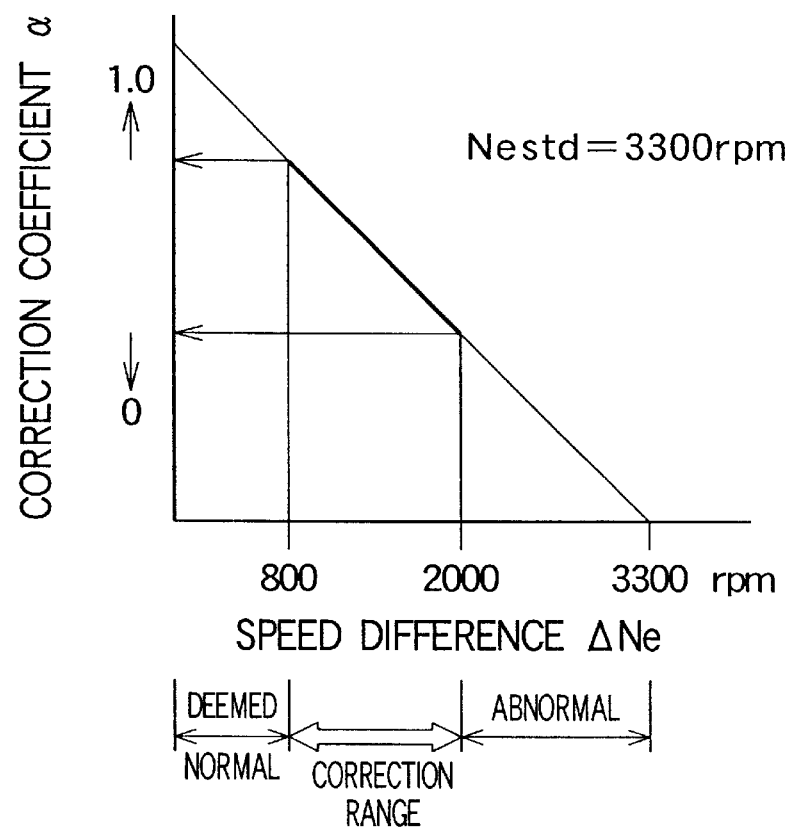
FIGS. 22A and 22B are graphs showing a relationship between an engine speed difference and a correction coefficient used in determining left and right motor control values in the control flow of FIG. 21C.

Referring to FIG. 22A, when the rated speed Nstd of the engine is 3300 rpm, if the speed difference ΔNe is 3300 rpm, it means that the engine has stopped, and this is abnormal. Similarly, if the speed difference ΔNe exceeds 2000 rpm, it means that the engine speed has dropped suddenly from 3300 rpm to 1300 rpm, and this is regarded as abnormal.

In practice the engine speed falling from 3300 rpm to 2500 rpm (speed difference ΔNe=800 rpm) is allowable. Accordingly, if the speed difference ΔNe is less than 800 rpm, it is regarded as normal (meaning that motor control value correction is not deemed necessary). Accordingly, motor control value correction is carried out over an engine speed difference ΔNe range of 800 rpm to 2000 rpm. And because the smaller is the engine speed difference ΔNe the smaller is the correction that is required, and the larger is the speed difference ΔNe the larger is the correction that must be made, the correction coefficient can be made a negative first-order straight line function.

Figure 22B:
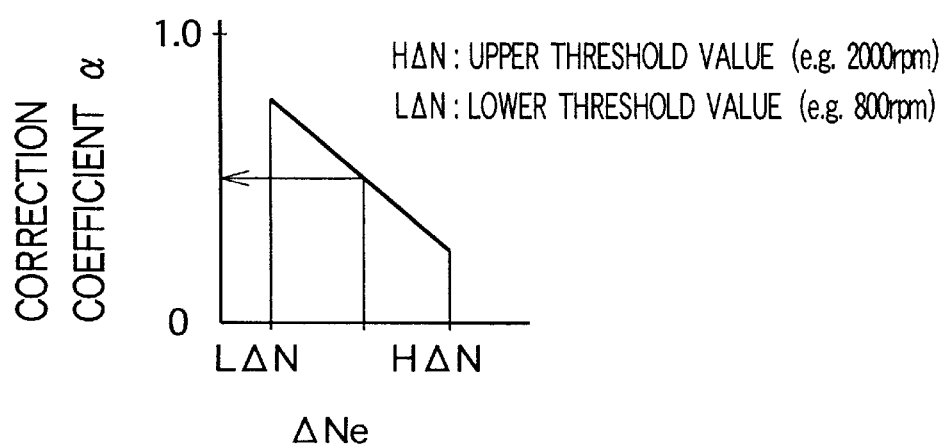

FIG. 22B is a graph obtained by generalizing FIG. 22A. The HΔN shown on the horizontal axis is an upper threshold value corresponding to a speed difference ΔNe of 200 rpm, and LΔN is a lower threshold value corresponding to a speed difference ΔNe of 800 rpm. When the speed difference ΔNe is between LΔN and HΔN, the correction coefficient a is applied to the left and right motor control values. α is a coefficient greater than 0 and less than 1.0.

Returning to FIG. 21C, ST55:

It is determined whether or not the speed difference ΔNe is equal to or greater than the lower threshold value LΔN. If NO, then because the speed difference ΔNe is in the 'regarded as normal' region of the horizontal axis, the processing ends. If YES, then processing proceeds to ST56.

ST56:

It is determined whether or not the speed difference ΔNe is equal to or lower than the upper threshold value HΔN. If NO, then because the speed difference ΔNe is in the 'abnormal' region of FIG. 22A, processing proceeds to ST57.

ST57:

A measure is taken such as generating a warning signal indicating abnormality or stopping the engine.

ST58:

In accordance with FIG. 22B, a correction coefficient a corresponding to the speed difference ΔNe is set.

ST59L:

The left motor control value TG2L obtained in ST30L, shown in FIG. 21B, is multiplied by α.

ST59R:

The right motor control value TG2R obtained in ST30R, shown in FIG. 21B, is multiplied by α.

ST60L:

A left motor control value TG3L is set, and the left electric motor is run on the basis of this left motor control value TG3L.

ST60R:

A right motor control value TG3R is set, and the right electric motor is run on the basis of this right motor control value TG3R.

When the speed of the engine 131 has changed, the engine 131 can be automatically restored to a predetermined speed by the control unit 124 and the throttle driver 145. At this time, the aperture change of the throttle valve 146, which opens and closes automatically in accordance with the load on the engine, can be utilized. That is, the control flow of FIG. 21C can be executed using a sudden change in the aperture of the throttle valve 146 instead of a sudden fall in the speed of the engine.

In this way, with the electrically-powered utility machine of this fourth preferred embodiment, when a large load acts on the utility tool, the speed of the engine driving the utility tool falls sharply. When this happens, the outputs of the left and right electric motors are lowered and the transit speed of the machine is reduced. Normally, the electric motors are controlled directly on the basis of the accelerator angle. However, in control of the left electric motor, when the left brake angle is large, the left motor control value is lowered, and when the right brake angle is large this is also taken into account and the left motor control value is lowered further. And by this kind of control being carried out, the operator can freely control the direction of transit of the vehicle. That is, the speed of transit of the vehicle can be made to correspond to the load on the utility tool.

Figure 20:
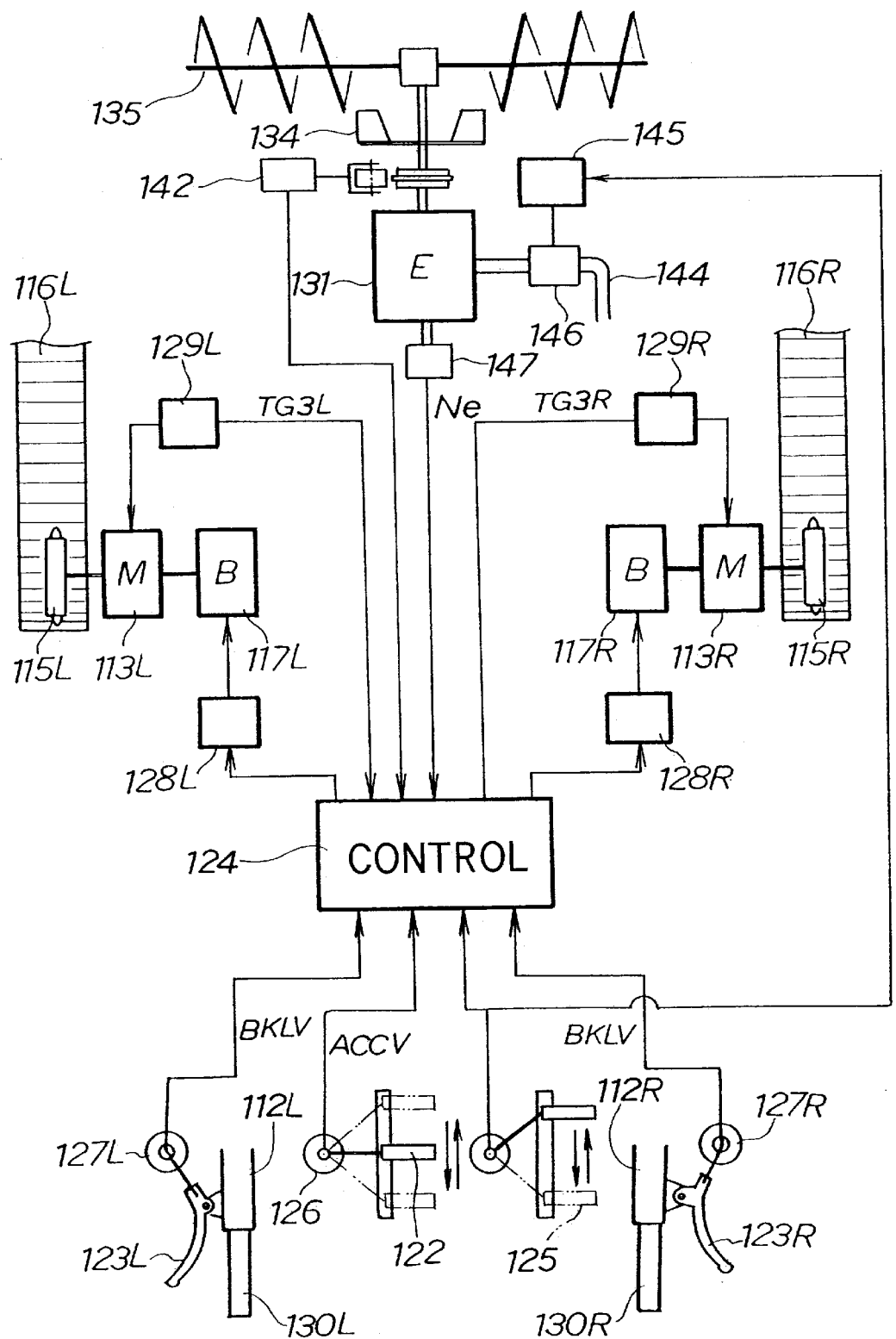
FIG. 20 is a control system diagram of the snow-clearing machine of the fourth preferred embodiment.
Figure 23:
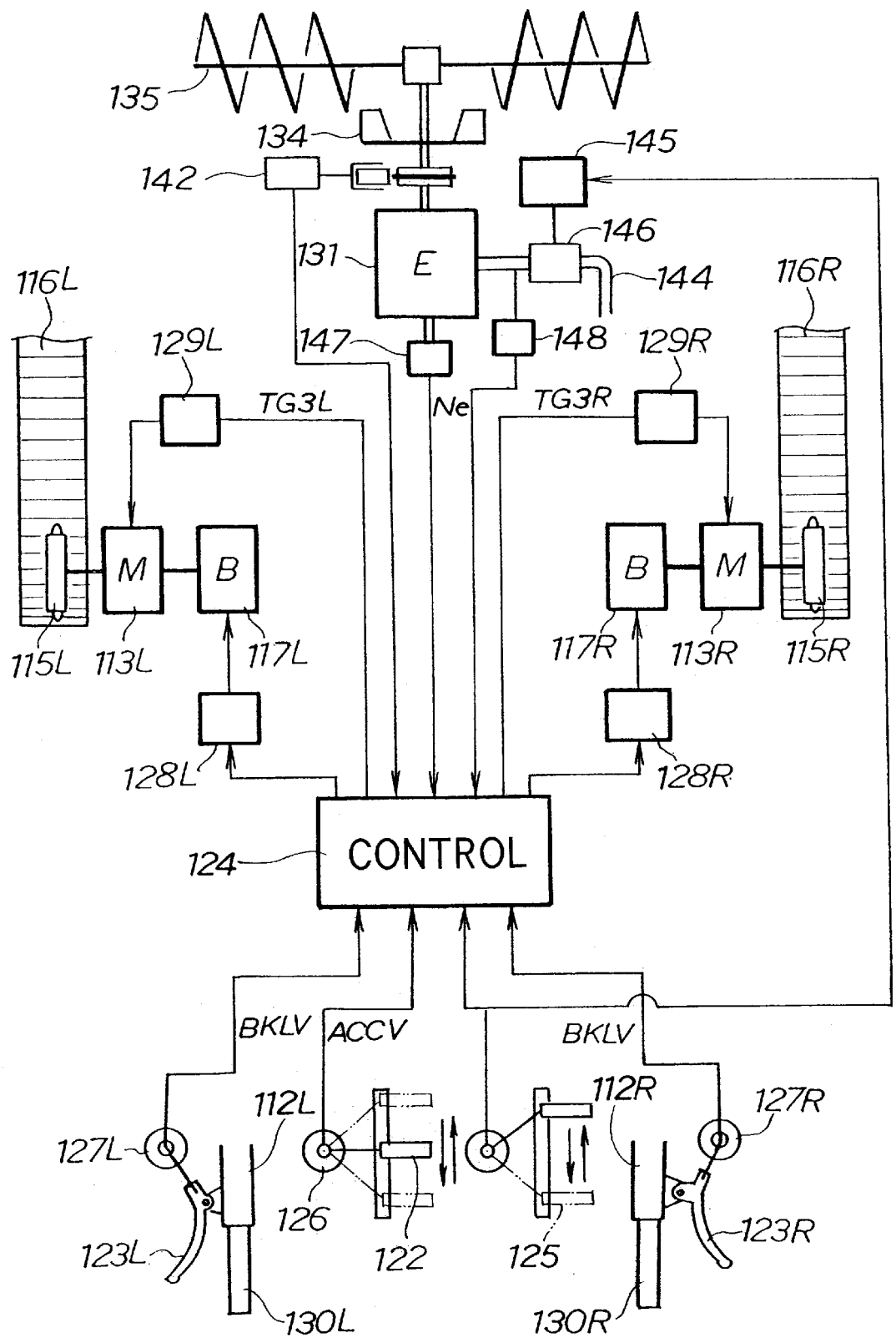
FIG. 23 is a control system diagram showing a variation of the control system of the fourth preferred embodiment shown in FIG. 20.

FIG. 23 shows an example of a variation of the control system of the electrically-propelled snow-clearer 100 of the fourth preferred embodiment shown in FIG. 20. In this variation, there is further provided an intake pressure sensor 148 for detecting the intake pressure as air is taken in to the engine 131 from the intake pipe 144 shown in FIG. 20 through the throttle valve 146. That is, the control unit 124 shown in FIG. 23 reads in the output voltage ACCV of the accelerator potentiometer 126, the output voltages BKLV, BKRV of the left and right brake potentiometers 127L and 127R, and the engine intake pressure, and in accordance with a control flow which will be discussed later generates a left motor control value TG3L and a right motor control value TG3R and controls the left and right electric motors 113L, 113R by way of the left and right motor drivers 129L, 129R on the basis of these respective control values TG3L and TG3R.

The other constituent elements shown in FIG. 23 are the same as the those shown in FIG. 20 and therefore the same reference numerals have been assigned to them and they will not be described again here.

The control flow shown in FIGS. 21A and 21B for the fourth preferred embodiment is also the same in this variation of the fourth preferred embodiment. Accordingly, the explanation will now proceed to the control flow shown in FIG. 24, which continues from C in the control flow shown in FIG. 21B.

Figure 24:
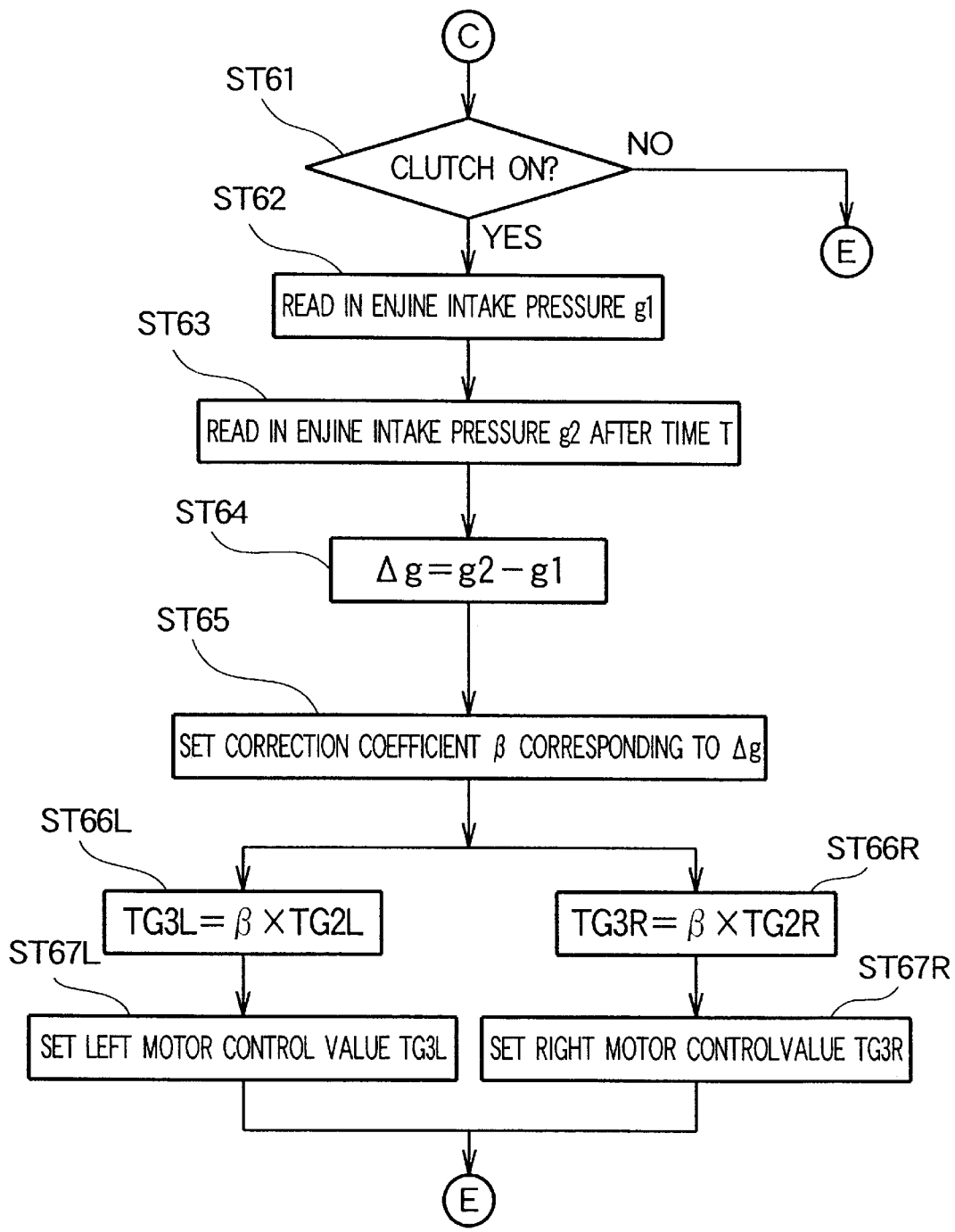
FIG. 24 is a view corresponding to FIG. 21C, which is a flow chart showing the determination of left and right motor control values based on an engine intake pressure difference.

In FIG. 24 ST61:

It is determined whether or not the clutch is ON. If the determination is NO, i.e. the clutch is OFF, because snow-clearing work is not being carried out, the subsequent control is unnecessary and processing ends.

ST62:

If the determination in ST61 is YES, the intake pressure g1 of the engine 131 is read in by the intake pressure sensor 148.

ST63:

After a time t from when the engine intake pressure g1 was read in by ST62, the engine intake pressure is read in again. This will be written g2. The time t is a short time.

ST64:

An engine intake pressure difference Δg (=g2−g1) is calculated.

Here, on the basis of the graph shown in FIG. 25, a relationship between elapsed time and intake pressure will be explained.

Figure 25:
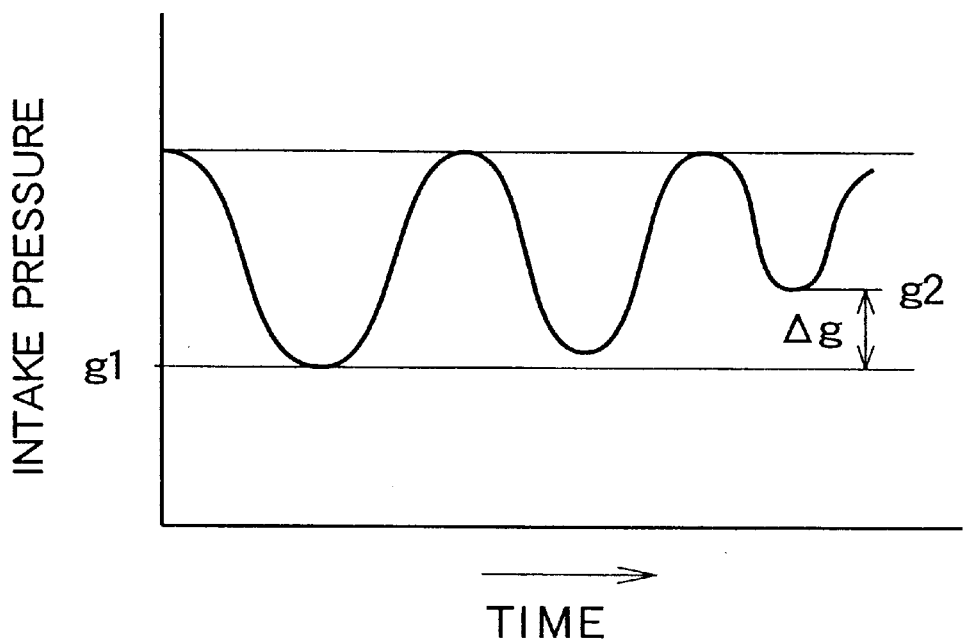
FIG. 25 is a graph showing a change of engine intake pressure with respect to time.

Referring to FIG. 25, the cylinders and pistons of the engine act like a reciprocating pump, and it will be supposed that, as a result of an intake valve opening and a piston descending, the intake negative pressure has fallen to g1. For example when an excessive force (load) acts on the crankshaft of the engine, the rate of descent of the piston falls, and the pump action weakens, and as a result the intake negative pressure only falls to g2 (g2>g1). The difference g2−g1 will be called the intake pressure difference Δg.

An important point here is that when an excessive load has acted on the engine, this shows up first in the intake negative pressure, and only after a delay does it appear in the engine speed and the throttle valve aperture. Therefore, by monitoring the intake negative pressure it is possible to execute control with good response.

Figure 26:
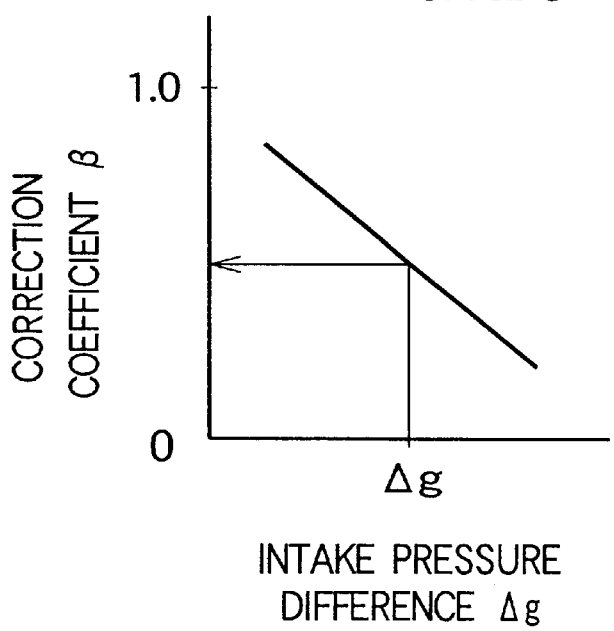
FIG. 26 is a graph showing a relationship between an engine intake pressure difference and a correction coefficient.
Figure 27:
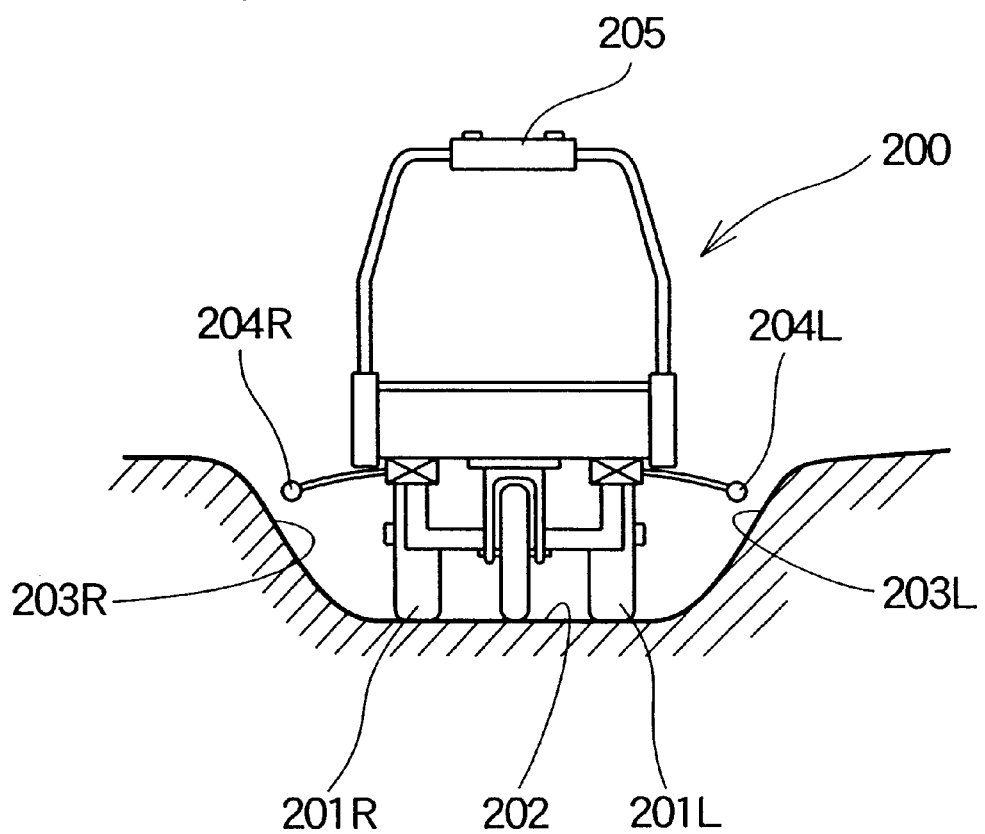
FIG. 27 is a front view of an electric dolly of related art.

Next, on the basis of the graph shown in FIG. 26, a relationship between the above-mentioned intake pressure difference and a correction coefficient β for correcting the left and right motor control values will be explained. In the graph of FIG. 26, the horizontal axis shows intake pressure difference Δg and the vertical axis shows a correction coefficient β greater than 0 and less than 1.0.

When the intake pressure difference Δg shown on the horizontal axis is large, it is likely that the intake pressure has risen because heavy snow or ice has hit the auger or the blower, for example, and at this time a correction coefficient β nearer to 0 (zero) is applied in order to greatly lower the speed of the snow-clearer. Conversely, when the intake pressure difference Δg shown on the horizontal axis is small, because the load on the snow-clearer is relatively small, it is only necessary to lower the speed of the snow-clearer slightly, and so it is sufficient to apply a correction coefficient β nearer to 1.0.

Returning to FIG. 24, ST65:

A correction coefficient β corresponding to the intake pressure difference Δg is set with reference to the graph of FIG. 26.

ST66L:

The left motor control value TG2L obtained in ST30L of the control flow shown in FIG. 21B is multiplied by β.

ST66R:

The right motor control value TG2R obtained in ST30R of the control flow shown in FIG. 21B is multiplied by β.

ST67L:

A final left motor control value TG3L is set, and the left electric motor is run on the basis of this left motor control value TG3L.

ST67R:

A final right motor control value TG3R is set, and the right electric motor is run on the basis of this right motor control value TG3R.

Thus, in this variation, when a large load acts on the utility tool and the engine negative pressure rises suddenly, the outputs of the left and right electric motors are lowered and the speed of transit of the machine is reduced. Normally, the electric motors are controlled directly on the basis of the accelerator angle. However, in this variation, control is executed whereby for example in control of the left electric motor, when the left brake angle is large, the left motor control value is lowered, and when the right brake angle is large this is also taken into account and the left motor control value is lowered further. And the same control is carried out for the right electric motor also. By this kind of control being carried out, the operator can freely control the direction of transit of the vehicle.

The accelerator levers and speed control levers referred to in the preferred embodiments and variations thereof described above do not have to be levers in a narrow sense, and may alternatively be dial switches, sliding switches or any other means by which it is possible to set a value manually.

Although in the foregoing fourth preferred embodiment and variation thereof an electrically-propelled snow-clearer was used for the purposes of the description as an example of an electrically-propelled utility machine according to the invention, an electrically-propelled utility machine according to the invention may alternatively be some other utility vehicle such as a mowing machine, a dozer or a cultivator, and there is no particular restriction on the type of the utility vehicle.

The present disclosure is related to the subject matters of Japanese Patent Application No. 2000-331549, filed Oct. 30, 2000, Japanese Patent Application No. 2000-331551, filed Oct. 30, 2000, Japanese Patent Application No. 2000-331552, filed Oct. 30, 2000, Japanese Patent Application No. 2000-331562, filed Oct. 30, 2000, and Japanese Patent Application No. 2001-134689, filed May 1, 2001, the disclosures of which are expressly incorporated herein by reference in their entireties.

What is claimed is:

1. An electric vehicle, comprising:
a vehicle body;
a left electric motor, mounted on the vehicle body, for driving a left driven wheel;
a left brake, mounted on the vehicle body, for braking the left driven wheel;
a right electric motor, mounted on the vehicle body, for driving a right driven wheel;
a right brake, mounted on the vehicle body, for braking the right driven wheel;
left and right control handles extending rearward from the vehicle body;
left and right grips provided at the ends of the control handles;
a left speed control lever, provided alongside the left grip, for controlling the left electric motor and the left brake; and
a right speed control lever, provided alongside the right grip, for controlling the right electric motor and the right brake.

2. An electric vehicle according to claim 1, further comprising a control unit for controlling the left and right electric motors, wherein the control unit reads in the positions of an accelerator lever and the left and right speed control levers controlled by an operator as an accelerator angle and a left brake angle and a right brake angle and converts the accelerator angle, the left brake angle and the right brake angle into an accelerator percentage, a left brake percentage and a right brake percentage and obtains a corrected left brake percentage by adjusting the left brake percentage for the influence of the right brake percentage and by correcting the accelerator percentage with this corrected left brake percentage obtains a left motor control value and controls the left electric motor with this left motor control value and obtains a corrected right brake percentage by adjusting the right brake percentage for the influence of the left brake percentage and obtains a right motor control value by correcting the accelerator percentage with this corrected right brake percentage and controls the right electric motor with this right motor control value.

3. An electric vehicle according to claim 2, further comprising utility tools, wherein the utility tools include an auger for displacing snow and a blower for ejecting displaced snow.

4. A transit control method for an electric vehicle having left and right electric motors for driving left and right driven wheels and having left and right brakes for adjusting the speeds of the left and right driven wheels, the method comprising the steps of:

substituting the positions of an accelerator lever and left and right speed control levers controlled by an operator as an accelerator angle, a left brake angle and a right brake angle;

converting the accelerator angle, the left brake angle and the right brake angle into an accelerator percentage, a left brake percentage and a right brake percentage;

obtaining a corrected left brake percentage by adjusting the left brake percentage for the influence of the right brake percentage, obtaining a left motor control value by correcting the accelerator percentage with the corrected left brake percentage, and controlling the left electric motor with the left motor control value; and obtaining a corrected right brake percentage by adjusting the right brake percentage for the influence of the left brake percentage, obtaining a right motor control value by correcting the accelerator percentage with the corrected right brake percentage, and controlling the right electric motor with the right motor control value.

5. A transit control method according to claim 4, wherein the electric vehicle further has a utility tool, an engine for driving the utility tool and a clutch provided in a power transmission path from the engine to the utility tool; the left motor control value is obtained by multiplying a value reached by correcting the accelerator percentage with the corrected left brake percentage by a correction coefficient less than one set in correspondence with a reduction of the speed of the engine occurring when the clutch is ON; and the right motor control value is obtained by multiplying a value reached by correcting the accelerator percentage with the corrected right brake percentage by a correction coefficient less than one set in correspondence with a reduction of the speed of the engine occurring when the clutch is ON.

6. A transit control method according to claim 5, wherein the utility tool is an auger for displacing snow and a blower for ejecting displaced snow.

7. A transit control method according to claim 4, wherein when the left and right brake angles are essentially the same, the speeds of the left and right electric motors are read in and the speed of whichever of the left and right electric motors is at the higher speed is controlled to the speed of the electric motor at the lower speed.

8. A transit control method according to claim 7, wherein when the accelerator percentage is written ACC %, the left brake percentage is written BKL %, the right brake percentage is written BKR %, a coefficient of influence on whichever of the left and right electric motors is being considered of the brake percentage pertaining to the other electric motor is written p (where p<1), and the maximum value of the control value of each electric motor is written Vmax, then the corrected left brake percentage is (BKL %+p×BKR %×ACC %), the left motor control value TG2L is Vmax×ACC %×{1−(BKL %+p×BKR %×ACC %)}, the corrected right brake percentage is (BKR %+p×BKL %×ACC %), and the right motor control value TG2R is Vmax×ACC %×{1−(BKR %+p×BKL %×ACC %)}.

9. A transit control method according to claim 8, wherein the electric vehicle further has a utility tool, and the utility tool is an auger for displacing snow and a blower for ejecting displaced snow.

10. A transit control method according to claim 4, wherein the electric vehicle further has a utility tool, an engine for driving the utility tool, and a clutch provided in a power transmission path from the engine to the utility tool, and the left and right electric motors are controlled in accordance with a detected load on the engine.

11. A transit control method according to claim 10, wherein the left motor control value is obtained by multiplying a value reached by correcting the accelerator percentage with the corrected left brake percentage by a correction coefficient less than one set in correspondence with a reduction in the speed of the engine occurring when the clutch is ON, and the right motor control value is obtained by multiplying a value reached by correcting the accelerator percentage with the corrected right brake percentage by a correction coefficient less than one set in correspondence with a reduction in the speed of the engine occurring when the clutch is ON.

12. A transit control method according to claim 11, wherein the utility tool is an auger for displacing snow and a blower for ejecting displaced snow.

13. A transit control method according to claim 10, wherein the left motor control value is obtained by multiplying a value reached by correcting the accelerator percentage with the corrected left brake percentage by a correction coefficient less than one set in correspondence with a reduction in the intake negative pressure of the engine occurring when the clutch is ON, and the right motor control value is obtained by multiplying a value reached by correcting the accelerator percentage with the corrected right brake percentage by a correction coefficient less than one set in correspondence with a reduction in the intake negative pressure of the engine occurring when the clutch is ON.

14. A transit control method according to claim 13, wherein the utility tool is an auger for displacing snow and a blower for ejecting displaced snow.

* * * * *